(12) United States Patent
Ikeda

(10) Patent No.: US 9,494,905 B2
(45) Date of Patent: Nov. 15, 2016

(54) BEARING MEMBER, END SECTION MEMBER, PHOTORECEPTOR DRUM UNIT, AND METHOD FOR MANUFACTURING BEARING MEMBER

(71) Applicant: MITSUBISHI CHEMICAL CORPORATION, Chiyoda-ku, Tokyo (JP)

(72) Inventor: Shuichi Ikeda, Odawara (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 14/826,268

(22) Filed: Aug. 14, 2015

(65) Prior Publication Data

US 2015/0346671 A1    Dec. 3, 2015

Related U.S. Application Data

(63) Continuation of application No. PCT/JP2014/053221, filed on Feb. 12, 2014.

(30) Foreign Application Priority Data

Feb. 15, 2013 (JP) ................. 2013-027512

(51) Int. Cl.
*G03G 21/16* (2006.01)
*B29C 45/26* (2006.01)
(Continued)

(52) U.S. Cl.
CPC ......... *G03G 15/757* (2013.01); *B29C 45/2602* (2013.01); *F16D 3/2052* (2013.01);
(Continued)

(58) Field of Classification Search
CPC ............ G03G 15/757; G03G 21/1647; F16D 3/2052; B29C 45/2602
USPC .................................................. 399/159, 117
See application file for complete search history.

(56) References Cited

U.S. PATENT DOCUMENTS 9,058,007 B2    6/2015  Iijima et al.
9,062,707 B2    6/2015  Ikeda
(Continued)

FOREIGN PATENT DOCUMENTS

JP    2006-072160 A    3/2006
JP    2008-233867 A    10/2008
JP    2010-026473 A    2/2010

OTHER PUBLICATIONS

International Search Report issued Mar. 18, 2014 in PCT/JP2014/053221 filed Feb. 12, 2014 with English translation.
(Continued)

*Primary Examiner* — Walter L Lindsay, Jr.
*Assistant Examiner* — Philip Marcus T Fadul
(74) *Attorney, Agent, or Firm* — Oblon, McClelland, Maier & Neustadt, L.L.P.

(57) ABSTRACT

A bearing member includes a concave section receiving a spherical body therein, and swing grooves into which end sections of a rotating force transmission pin are inserted. The swing groove at least includes a parallel part an axis and a curved part, an undercut section is not provided in the concave section when the concave section is viewed from an opened side of the concave section in a direction of the axis of the bearing member, and a clearance between the two swing grooves in a direction which is orthogonal to the direction of the axis on the opened side of the concave section is shorter than a distance between both ends of the rotating force transmission pin in the direction which is orthogonal to the axis of the bearing member even when the shaft member is mounted on the bearing member in a posture inclined at the most.

11 Claims, 23 Drawing Sheets

(51) Int. Cl.
  *F16D 3/20* (2006.01)
  *G03G 15/00* (2006.01)
  *F16D 3/205* (2006.01)
  *B29L 31/04* (2006.01)
  *B29K 101/00* (2006.01)

(52) U.S. Cl.
  CPC ....... *G03G21/1647* (2013.01); *B29K 2101/00* (2013.01); *B29L 2031/04* (2013.01); *G03G 2221/1657* (2013.01)

(56) References Cited

U.S. PATENT DOCUMENTS

| | | | |
|---|---|---|---|
| 2008/0152388 A1 | 6/2008 | Ueno et al. | |
| 2008/0260428 A1* | 10/2008 | Ueno | G03G 15/757 399/167 |
| 2010/0034561 A1* | 2/2010 | Batori | G03G 15/757 399/167 |
| 2011/0091239 A1 | 4/2011 | Ueno et al. | |
| 2011/0182619 A1 | 7/2011 | Batori et al. | |
| 2013/0064569 A1 | 3/2013 | Ueno et al. | |
| 2013/0230337 A1 | 9/2013 | Batori et al. | |
| 2013/0322923 A1* | 12/2013 | Ikeda | B29D 99/00 399/117 |
| 2014/0056613 A1 | 2/2014 | Ueno et al. | |
| 2014/0086632 A1 | 3/2014 | Batori et al. | |
| 2014/0086633 A1 | 3/2014 | Batori et al. | |
| 2014/0099144 A1 | 4/2014 | Ueno et al. | |
| 2015/0110522 A1 | 4/2015 | Ikeda et al. | |

OTHER PUBLICATIONS

Written Opinion issued Mar. 18, 2014 in PCT/JP2014/053221 filed Feb. 12, 2014.
Japan Institute of Invention and Innovation Journal of Technical disclosure, Japan Institute for Promoting Invention and Innovation No. 2010-502200.
Extended European Search Report issued Feb. 18, 2016 in Patent Application No. 14751511.8.

* cited by examiner

BEARING MEMBER, END SECTION MEMBER, PHOTORECEPTOR DRUM UNIT, AND METHOD FOR MANUFACTURING BEARING MEMBER

CROSS REFERENCE TO RELATED APPLICATION(S)

This application is a continuation of International Patent Application No. PCT/JP2014/053221 filed on Feb. 12, 2014, claiming the benefit of priority of Japanese Patent Application No. 2013-027512 filed on Feb. 15, 2013, the contents of which are incorporated herein by reference in its entirety.

BACKGROUND OF THE INVENTION

1. Field of the Invention

The present invention relates to a photoreceptor drum unit which is provided in an image forming apparatus, such as a laser printer or a copying machine, a bearing member which is disposed in the photoreceptor drum unit, an end section member, and a method for manufacturing the bearing member.

2. Description of the Related Art

In an image forming apparatus which is represented by a laser printer or a copying machine, a process cartridge which is attachable to and detachable from a body (hereinafter, refer to as an "apparatus body") of the image forming apparatus is provided.

The process cartridge is a member which forms contents to be expressed by letters or figures and transfers the contents to a recording medium, such as a paper sheet, and here, includes a photoreceptor drum in which the transferred contents are formed. Furthermore, in the process cartridge, in addition to the photoreceptor drum, various means for forming the contents to be transferred by acting on the photoreceptor drum are disposed. Examples of these means include means for developing on a surface of the photoreceptor drum, means for charging the photoreceptor drum, and means for cleaning the photoreceptor drum.

In case of the process cartridge, the same process cartridge is attached to and detached from the apparatus body for maintenance, or a new process cartridge is mounted on the apparatus body instead of disengaging an old process cartridge from the apparatus body for replacing the process cartridge with a new process cartridge. Attaching and detaching the process cartridge in this manner is performed by users of the image forming apparatus themselves, and it is desirable to easily perform attaching and detaching as much as possible from such a point of view.

However, a driving shaft of the apparatus body is engaged with the photoreceptor drum which is included in the process cartridge directly or via another member, and according to this, the photoreceptor drum receives a rotating force from the driving shaft and rotates. Therefore, in order to attach and detach the process cartridge to and from the apparatus body, it is necessary to release (disengage) the engagement between the driving shaft of the apparatus body and the photoreceptor drum every time attaching and detaching the process cartridge occurs, and to mount the process cartridge again.

Here, if it is possible to move the photoreceptor drum (process cartridge) in a direction of an axis of the driving shaft of the apparatus body, and to attach and detach the photoreceptor drum, the above-described structure for attaching and detaching can be relatively easily configured.

However, from the viewpoint of reducing the image forming apparatus in size or ensuring an attachment and detachment space of the process cartridge, it is preferable to disengage the process cartridge from the apparatus body to be pulled out in a direction which is different from the direction of the axis of the driving shaft, and to mount the process cartridge to the apparatus body to be pushed in this direction.

In JP-A-2010-26473 as Patent Literature 1, a structure for attaching and detaching a process cartridge in a direction which is different from a direction of an axis of a driving shaft of an apparatus body is disclosed. Specifically, a coupling member which is disclosed in JP-A-2010-26473 is swingably installed to a drum flange by providing a spherical section. Therefore, a part which is provided in the coupling member and engages with the driving shaft of the apparatus body can swing around the spherical section, an angle with respect to the axis of the photoreceptor drum can be changed, and disengagement between the driving shaft of the apparatus body and the photoreceptor drum becomes easier.

In addition, in Japan Institute of Invention and Innovation Journal of Technical disclosure, Japan Institute for Promoting Invention and Innovation No. 2010-502200 as Non-Patent Literature 1, a structure, in which a groove for introducing a rotating force transmission pin provided in a shaft member to a bearing member is provided in a rotating direction of an inner circumference of the bearing member, and installation of the rotating force transmission pin to the bearing member is easily performed due to the groove, is disclosed. In addition, here, a technology for integrally molding the bearing member is also described.

Patent Literature 1: JP-A-2010-26473

Non-Patent Literature 1: Japan Institute of Invention and Innovation Journal of Technical disclosure, Japan Institute for Promoting Invention and Innovation No. 2010-502200

SUMMARY OF THE INVENTION

However, in the structure of the coupling member described in JP-A-2010-26473 and the drum flange (bearing member) for holding the coupling member, in order to make a structure which holds the spherical section to the drum flange while allowing the coupling member to swing, it is necessary to forcibly insert the spherical section when installing the spherical section to the drum flange (bearing member). In assembling the spherical section forcibly, there is a concern that assembly precision deteriorates or components are damaged during the assembly.

In addition, in JP-A-2010-26473, a method for assembling other components of the coupling member in order after positioning a part of the components by decomposing the coupling member to the drum flange (bearing member), is also described. According to this, there are no issues, such as the forcible insertion, but there are still the issues of man-hours increasing, and productivity deteriorating. In other words, from the viewpoint of production, there is also a problem in that production cost increases due to an increase in man-hours or an increase in the number of components, or the number of quality control items increase, for example, assembly precision deteriorates. From the same viewpoint, it is desirable to reduce the number of components as much as possible, not being limited to complete integration.

In addition, it is also difficult to install the drum flange (bearing member) on which the coupling member is swingably installed in this manner to an end section of the photoreceptor drum with high precision. Furthermore, according to the structure in which the coupling member or the drum flange are formed of a plurality of members in this manner, and manufacturing is performed while the components are assembled consecutively, there is a concern that a problem in strength of bonding locations between the members is generated.

Meanwhile, it is possible to solve the problems according to Non-Patent Literature 1, but since the groove for inserting the rotating force transmission pin of the shaft member is linked to a side wall section of a groove for swinging, there is a concern that the shaft member is carelessly removed.

In addition, in Non-Patent Literature 1, a method for integrally molding is disclosed, but it is difficult to realize smooth installation of the shaft member with only the method disclosed in Non-Patent Literature 1, smooth swinging of the shaft member, and smooth attachment and detachment of the shaft member to and from the apparatus body.

Here, in consideration of the above-described problems, an object of the present invention is to provide a bearing member, an end section member, and a photoreceptor drum unit, which can easily perform production by suppressing issues, such as damage, with high precision, while it is possible to transfer the equivalent rotating force to that of the related art, and to attach and detach the shaft member to and from the apparatus body. In addition, there is provided a manufacturing method of such an end section member.

Hereinafter, some non-limited aspects of the present invention will be described. Here, a part of reference numerals in the drawings is illustrated as an example by being written in parentheses in order to make it easy to understand, but the present invention is not limited thereto.

An aspect of the present invention provides a bearing member (45) to be disposed in an end section of a photoreceptor drum (35), wherein a shaft member (70) which includes a spherical body (90) of which at least one part is spherical and a rotating force transmission pin (95) provided to protrude from the spherical body is swingably installed in the bearing member, the bearing member including: a concave section (51c) in which one section is opened and a bottom section (51b) on a side opposite to the one section has a curved surface along the spherical body, the concave section receiving the spherical body therein; and at least two swing grooves (52) being grooves which are provided on a side surface of the concave section and into which end sections of the rotating force transmission pin are inserted, wherein the swing groove at least includes a parallel part which is parallel to an axis of the bearing member and a curved part (52a) curved toward the axis, wherein an undercut section is not provided in the concave section when the concave section is viewed from an opened side of the concave section in a direction of the axis of the bearing member, and wherein a clearance (XIIIa) between the two swing grooves in a direction which is orthogonal to the direction of the axis on the opened side of the concave section is formed to be shorter than a distance (XIIIb) between both ends of the rotating force transmission pin in the direction which is orthogonal to the axis of the bearing member even when the shaft member is mounted on the bearing member in a posture inclined at the most.

As an aspect of the bearing member (145) according to the present invention, the bearing member further includes a protruded section (152a) provided at the curved part (52a) of the swing groove (152).

As an aspect of the bearing member (45) according to the present invention, the curved part (52a) of the swing groove (52) is formed in an arc shape, and a center of the arc-shape matches a center of the curved surface of the bottom section (52b) of the concave section (51c) of the bearing member (45).

As an aspect of the bearing member (245, 345) according to the present invention, the swing groove (252, 352) is provided with a step (252a) or an inclination (352a) in a direction of separating from the axis of the bearing member (245, 345) between the curved part (52a) and the parallel part.

As an aspect of the bearing member (45) according to the present invention, an undercut section is not provided in the swing groove (52) when the bearing member is viewed from the side opposite to the opened side of the concave section (51c).

As an aspect of the bearing member (45) according to the present invention, all elements of the bearing member are integrally formed.

An end section member (40) according to an aspect of the present invention includes: the bearing member (45) according to the aspect of the present invention; and a shaft member (70) which is swingably installed to the bearing member, wherein the shaft member includes: a rotating force receiving section to be linked to a rotating driving shaft; a spherical body (90) which is interlocked with the rotating force receiving section, and in which at least a part disposed in the concave section of the bearing member is spherical; and a rotating force transmission pin (95) which protrudes from the spherical body and in which the protruded part is movable in the swing groove (52) of the bearing member.

As an aspect of the end section member (40) according to the present invention, the shaft member is prevented from being removed from the bearing member as the rotating force transmission pin (95) of the shaft member (70) is hooked to the curved part (52a) of the swing groove (52) of the bearing member (45).

As an aspect of the end section member (240) according to the present invention, the rotating force transmission pin (95) of the shaft member (70) is allowed to be in a posture in which both ends of the rotating force transmission pin protrude from the spherical body (90), and a posture in which only one end of the rotating force transmission pin protrudes, wherein the spherical body is rotatable in the concave section of the bearing member by the curved part (52a) of the swing groove (252) of the bearing member (245) within a range where the movement of the rotating force transmission pin in the swing groove is regulated, and wherein the movement of the rotating force transmission pin in the direction of the axis of the bearing member is regulated by the curved part of the swing groove, and the shaft member is installed to the bearing member to be turnable in a posture in which the movement is regulated.

A photoreceptor drum unit according to an aspect of the present invention includes: a photoreceptor drum; and the end section member according to the aspect of the present invention which is installed at least to one of end sections in a direction of an axis of the photoreceptor drum.

A method for manufacturing a bearing member (45) includes a step of forming by injection molding, wherein the step includes combining a first mold (100) which forms the concave section (51c) and a second mold (110) which forms the swing grooves (52) by putting the second mold into a groove (100a) provided in the first mold, performing the injection molding and pulling apart the first mold and the second mold in opposite directions to each other.

According to the end section member and the photoreceptor drum unit of the present invention, it is possible to easily perform production by suppressing issues, such as damage, with high precision, while it is possible to transfer the equivalent rotating force to that of the related art, and to attach and detach the shaft member to and from the apparatus body. In addition, it is possible to prevent the shaft member from being unintentionally removed from the bearing member.

Meanwhile, according to a method for manufacturing the bearing member, in a case of an aspect in which an undercut section is not provided, it is possible to more efficiently manufacture the bearing member.

DETAILED DESCRIPTION OF THE EXEMPLARY EMBODIMENTS

Figure 1:
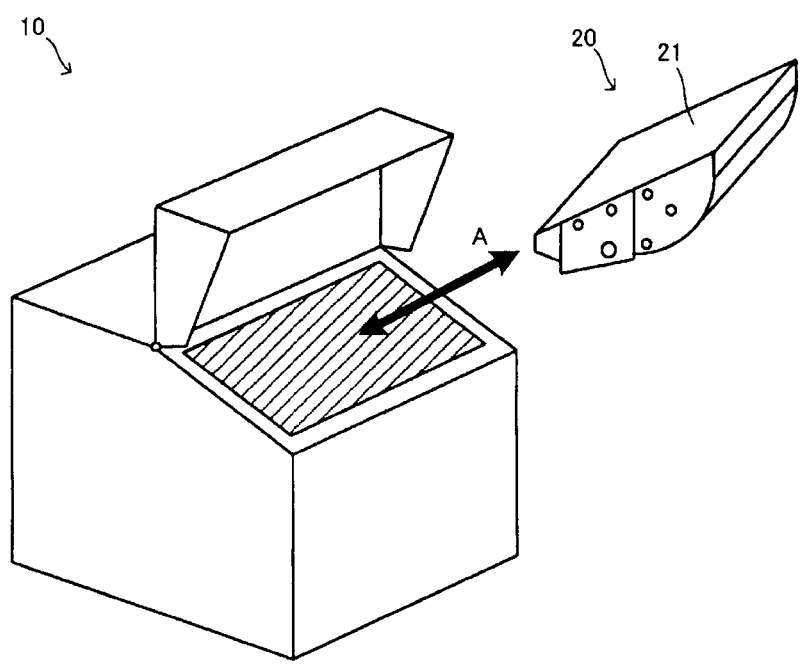
FIG. 1 is a schematic view of an image forming apparatus body and a process cartridge.

The above-described effects and advantages of the present invention are apparent from the aspects for realizing the invention which will be described in the following. Hereinafter, the present invention will be described based on embodiments illustrated in the drawings. However, the present invention is not limited to the embodiments.

FIG. 1 is a schematic perspective view illustrating a process cartridge 20 which is provided with an end section member 40 (refer to FIGS. 2A and 2B), and an image forming apparatus body 10 (hereinafter, there is a case of being referred to as a "apparatus body 10") which uses the process cartridge 20 by mounting the process cartridge 20 on the apparatus body 10 according to a first embodiment. As illustrated in FIG. 1, the process cartridge 20 can be mounted on the apparatus body 10 by being moved in a direction illustrated with A in FIG. 1, and can be disengaged. The direction is different from a direction of an axis of a driving shaft of the apparatus body 10. In addition, an image forming apparatus is made of the apparatus body 10 and the process cartridge 20, and hereinafter, will be described in detail.

The process cartridge 20 includes a housing 21 shaping an outline thereof, and includes various components inside thereof. Specifically, in the embodiment, a photoreceptor drum unit 30 (refer to FIG. 2A), a charging roller, a developing roller, a developing blade, a transfer roller, and a cleaning blade, are provided.

Figure 2A:
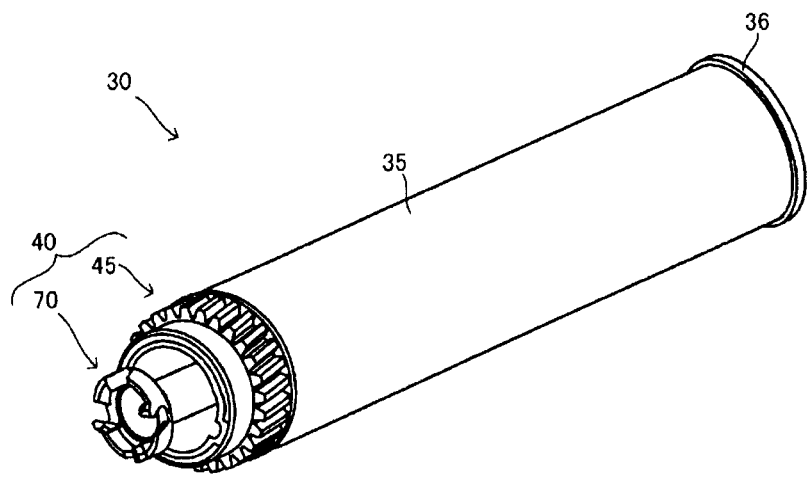
FIG. 2A is a perspective view of an external appearance of a photoreceptor drum unit according to one embodiment.
Figure 2B:
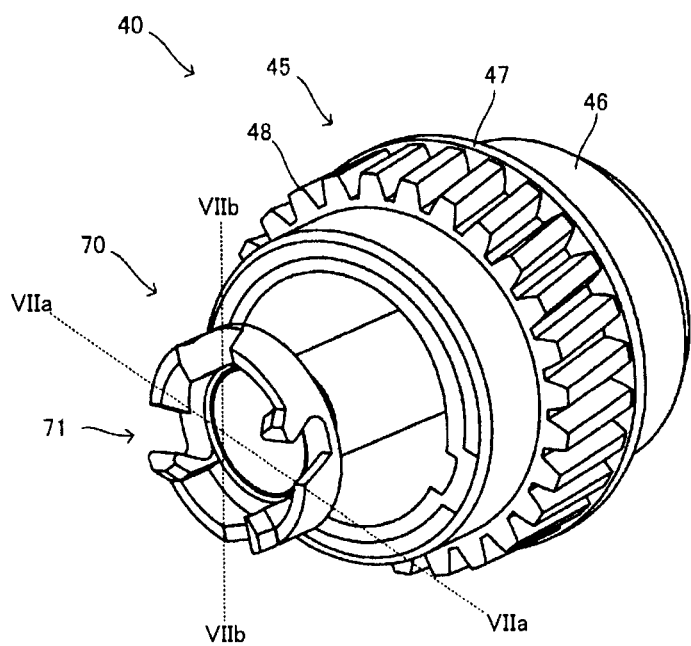
FIG. 2B is a perspective view of an external appearance of an end section member.

The photoreceptor drum unit 30 is a member which forms letters or figures to be transferred to a recording medium, such as a paper sheet. FIG. 2A illustrates a perspective view of an external appearance of the photoreceptor drum unit 30. As can be ascertained from FIG. 2A, the photoreceptor drum unit 30 is provided with a photoreceptor drum 35, a lid member 36, and an end section member 40. FIG. 2B is a perspective view focusing the end section member 40. Hereinafter, with reference to FIGS. 2A and 2B and other drawings, the photoreceptor drum unit 30 will be described.

The photoreceptor drum 35 is a member which is covered with a photoreceptor layer on an outer circumferential surface of a drum cylinder which has a cylindrical shape. In other words, the drum cylinder is covered with the photoreceptor layer on a conductive cylinder, such as aluminum, the end section member 40 is installed to one end of the drum cylinder as will be described later, and the lid member 36 is disposed at the other end. In the embodiment, the drum cylinder has a cylindrical shape, but may have a solidly columnar shape. However, at least the lid member 36 and the end section member 40 are formed to be appropriately installed in the end sections of the drum cylinder.

The lid member 36 is a member which is formed of a resin, and a fitting section which is fitted to the inside of the cylinder of the photoreceptor drum 35, and a bearing section which is disposed to cover one end surface of the photoreceptor drum 35 are formed coaxially. The bearing section has a shape of a disk which covers the end surface of the photoreceptor drum 35, and is provided with a part that receives a shaft of the apparatus body 10. In addition, an earth plate which is made of a conductive material is disposed in the lid member 36, and according to this, the photoreceptor drum 35 and the apparatus body 10 are electrically connected to each other.

In addition, in the embodiment, an example of the lid member is described, but the lid member is not limited thereto, and it is possible to employ a lid member which is generally obtained according to another embodiment. For example, a gear for transmitting a rotating force to the lid member may be disposed.

In addition, conductive materials as described below may be provided on the end section member 40 side which will be described later.

The end section member 40 is a member which is installed in the end section on a side opposite to the lid member 36 among the end sections of the photoreceptor drum 35, and is provided with a bearing member 45 and a shaft member 70.

Figure 3:
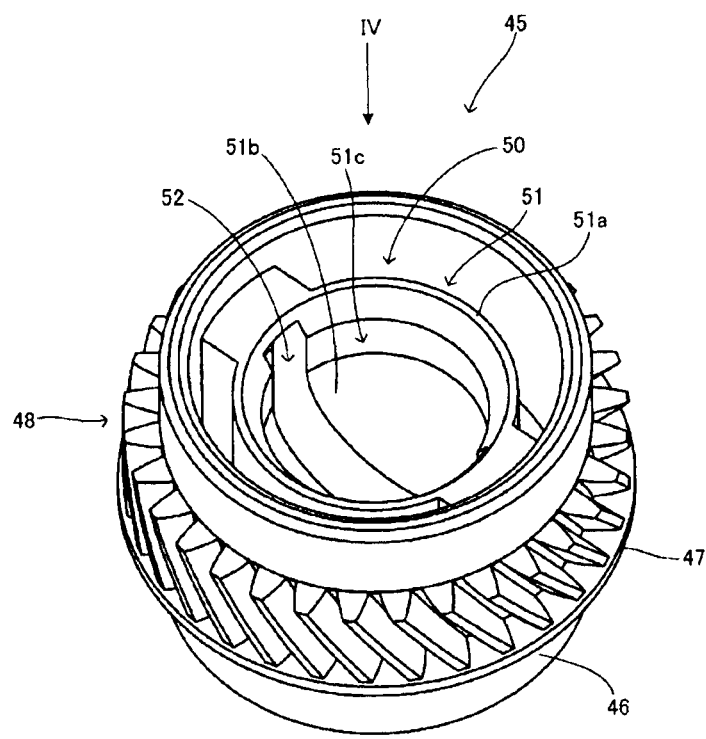
FIG. 3 is a perspective view of an external appearance of a bearing member.
Figure 4:
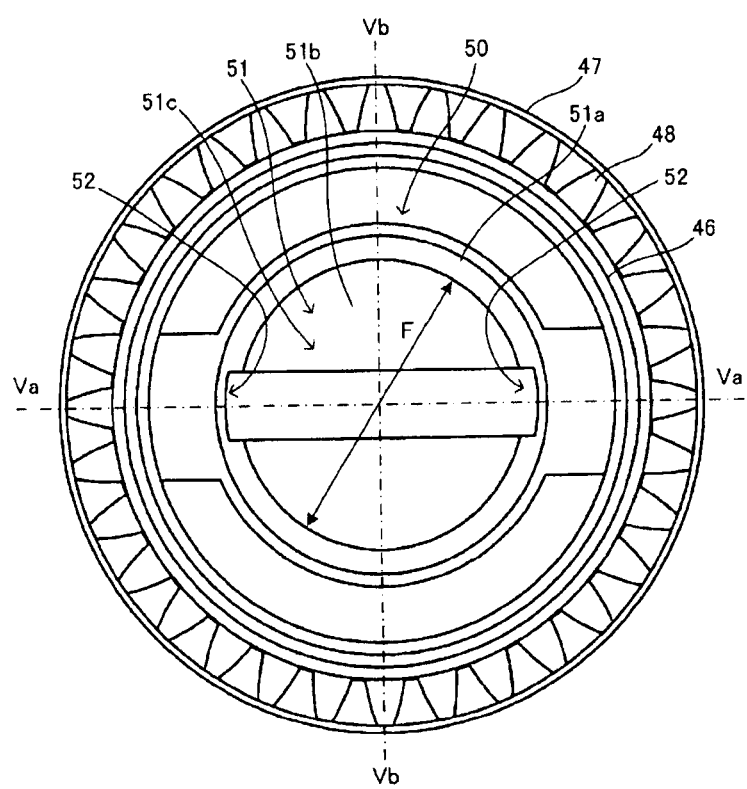
FIG. 4 is a plan view when viewed from a direction illustrated with an arrow IV of FIG. 3.
Figure 5A:
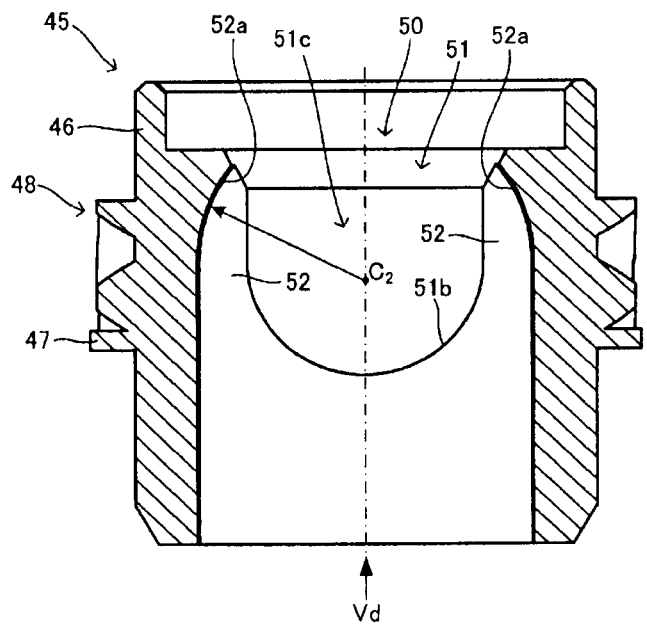
FIG. 5A is a sectional view along line Va-Va of FIG. 4.
Figure 5B:
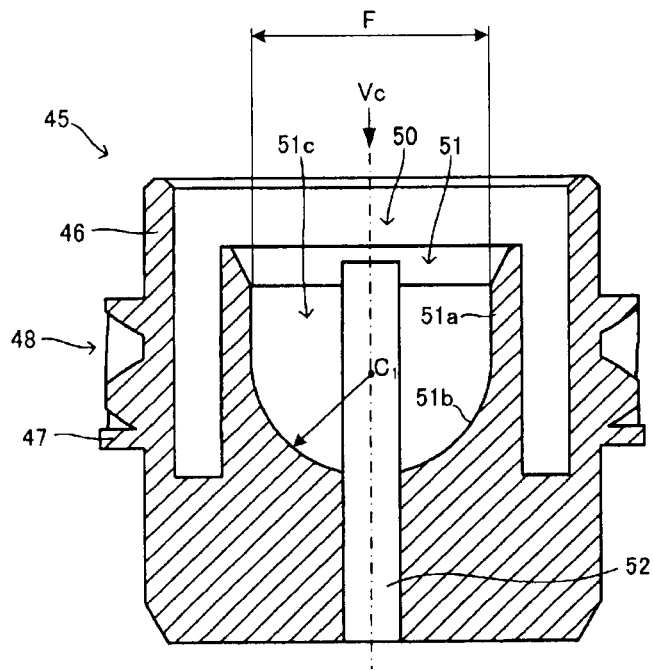
FIG. 5B is a sectional view along line Vb-Vb of FIG. 4.

The bearing member 45 is a member which is fixed to the end section of the photoreceptor drum 35. FIG. 3 is a perspective view of the bearing member 45. In addition, FIG. 4 is a view from a direction (side into which the shaft member 70 is inserted) which is illustrated with an arrow IV in FIG. 3, and respectively, FIG. 5A is a sectional view along a line illustrated with Va-Va in FIG. 4 and FIG. 5B is a sectional view along a line illustrated with Vb-Vb in FIG. 4. In addition, in FIGS. 5A and 5B, end surfaces (cut-out surfaces) in sectional views are illustrated by hatching.

In the embodiment, as can be ascertained from FIGS. 2 to 5B, the bearing member 45 is provided with a tube-shaped body 46 which has a cylindrical shape. In addition, on an outer circumferential surface of the tube-shaped body 46, a contact wall 47 which has a shape of a ring that stands along the outer circumferential surface, and a gear 48 are formed. An outer diameter of the tube-shaped body 46 is generally the same as an inner diameter of the photoreceptor drum 35, and the bearing member 45 is fixed to the photoreceptor drum 35 by putting one end side of the tube-shaped body 46 into the photoreceptor drum 35 and making the one end side fit to the photoreceptor drum 35. At this time, the end surface of the photoreceptor drum 35 is inserted until the end surface reaches a part having a depth at which the end surface hits the contact wall 47. At this time, an adhesive may be used for more solid installation. In addition, a groove or an irregularity part may be provided in the tube-shaped body 46 of a part where the adhesive is disposed. Accordingly, the adhesive is held in the groove or a concave section, and further, solid adhesion is possible.

The gear 48 is a gear which transmits the rotating force to a roller which is adjacent to the developing roller or the like, and in the embodiment, the gear 48 is a helical gear. A type of the gear is not particularly limited, and may be a spur gear. Alternatively, the gear is not necessarily provided.

A holding section 50 is formed on an inner side which has a shape of a tube of the tube-shaped body 46. The holding section 50 is a part which holds the shaft member 70 swingably as will be described later, and is formed to have a spherical body receiving section 51 and an swing groove 52.

The spherical body receiving section 51 is a part having a shape of a container in a cylinder having a bottom that is formed on the inner side of the tube-shaped body 46, and has a wall section 51a and a bottom section 51b.

As can be ascertained from FIGS. 4 and 5B, the wall section 51a is a cylindrical part which is concentric to the tube-shaped body 46. In FIGS. 4 and 5B, a diameter of the cylindrical inner side of the wall section 51a illustrated with F is generally the same as a diameter of a spherical body 90 of the shaft member 70 which will be described later.

Meanwhile, the bottom section 51b is a part which forms a bottom to cover one side end section of the cylindrical wall section 51aIn addition, the bottom section 51b has a shape which is curved in a hemispherical shape. As illustrated in FIG. 5B, a center C1 of the hemispherical shape of the bottom section 51b is formed to be on an axis of the bearing member 45, and a radius is generally the same as a radius of the spherical body 90 of the shaft member 70 which will be described later.

In addition, a concave section 51c is formed on the inner side which is surrounded by the wall section 51a and the bottom section 51b, and a bottom (that is, the bottom section 51b) of the concave section 51c has a concave shape which is curved in a hemispherical shape. In the concave section 51c, a side which is opposite to the bottom section 51b is opened. The concave section 51c is a space which receives the spherical body 90 of the shaft member 70 therein.

Here, the spherical body receiving section 51 is formed without providing an undercut section when viewed from a front surface in a direction of an axis as illustrated with an arrow Vc in FIG. 5B from the opened side of the concave section 51cThe phrase "without providing an undercut section" means that the bottom section 51b side of the concave section 51c when viewed from the arrow Vc is at a position which is closer to an axis side than the opened side of the concave section 51c or at the same position as that of the axis side, on an arbitrarily adjacent cross section which is orthogonal to the direction of the axis of the spherical body receiving section 51.

In addition, in the embodiment, as can be ascertained from FIG. 5B, a void is provided between an outer circumferential surface of the wall section 51a and an inner circumferential surface of the tube-shaped body 46.

The swing groove 52 is a groove which is provided at a part of the wall section 51a of the spherical body receiving section 51, and extends in parallel to the direction of the axis of the bearing member 45. In the embodiment, two parallel swing grooves 52 are provided to oppose each other so that the axis of the bearing member 45 is located therebetween. As can be ascertained in FIGS. 5A and 5B, the swing groove 52 is formed as a slit-shaped groove is provided from an end section which is on a side opposite to the opened section side of the concave section 51c in the tube-shaped body 46.

In addition, as can be ascertained from FIG. 5A, the opened side end section of the concave section 51c in the swing groove 52 is curved so as to narrow a bottom clearance of the grooves. In the embodiment, it is preferable that the curved part is formed along an arc around a point C2, the point C2 is generally at the same position as that of the point C1 which is on the axis of the tube-shaped body 46, and which is the hemispherical center of the bottom section 51b of the spherical body receiving section 51.

Here, in the swing groove 52 of the embodiment, as illustrated with an arrow Vd in FIG. 5A from the side opposite to the opened side of the concave section 51c, when viewed from the front surface in the direction of the axis, the undercut section is not provided. The phrase "the undercut section is not provided" means that a side which is far from the arrow Vd is at a position which is closer to the axis side than a side near to the arrow Vd or at the same position as that of the axis side when viewed from the direction of the arrow Vd on an arbitrarily adjacent cross section which is orthogonal to the direction of the axis of the swing groove 52. In the present invention, it is not necessarily essential that the undercut section is not provided here. However, according to this configuration, as will be described later, it is possible to easily perform integral molding.

Since further structural characteristics of each of the above-described parts that constitute the holding section 50 are correlated to the shape of the shaft member 70, such characteristics will be described when the combination of the bearing member 45 and the shaft member 70 is described.

A material which constitutes the bearing member 45 is not particularly limited, but resin made of polyacetal, polycarbonate, or PPS can be used. Here, in order to improve rigidity of the member, glass fibers, carbon fibers, or the like, may be mixed in the resin in accordance with a loading torque. In addition, in order to install the shaft member and smoothly perform a swing operation, a sliding characteristic may be improved by containing at least one of fluorine, polyethylene, and silicone rubber in the resin. In addition, the resin may be coated with fluorine, and may be coated with a lubricant.

Figure 6:
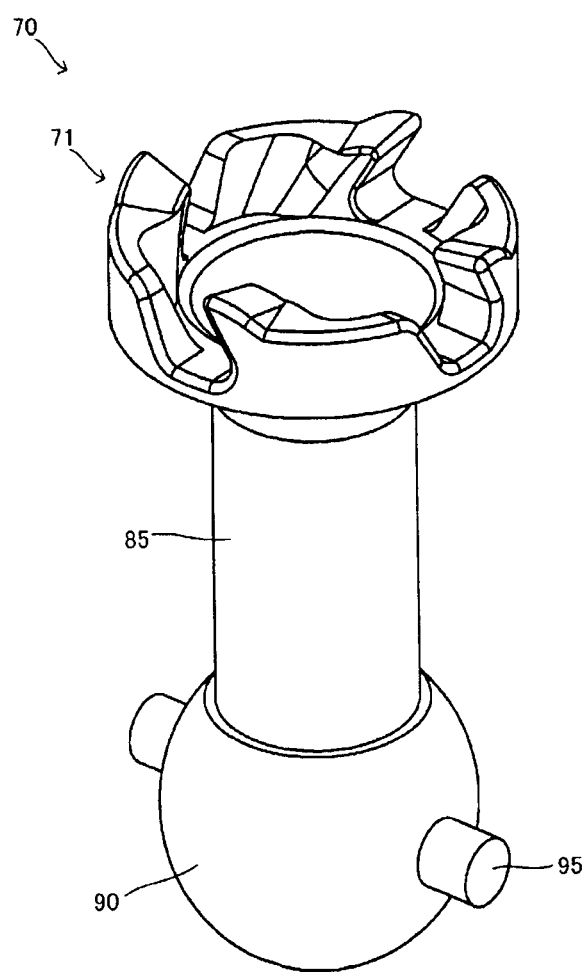
FIG. 6 is a perspective view of the bearing member.
Figure 7A:
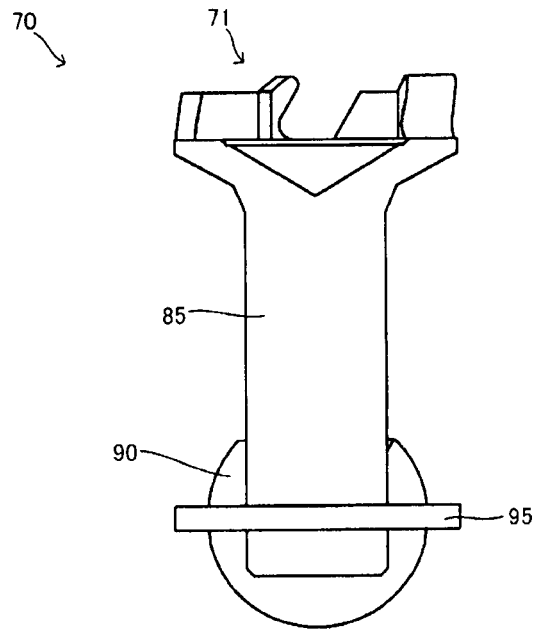
FIG. 7A is a sectional view along line VIIa-VIIa of a shaft member illustrated in FIG. 2B.
Figure 7B:
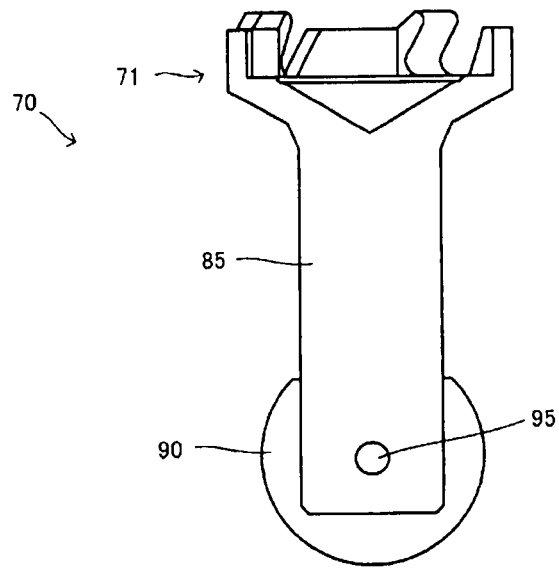
FIG. 7B is a sectional view along line VIIb-VIIb of the shaft member illustrated in FIG. 2B

Returning to FIGS. 2A and 2B, the shaft member 70 in the end section member 40 will be described. FIG. 6 is a perspective view of the shaft member 70, and FIG. 7A is a sectional view along line VIIa-VIIa of the shaft member 70 illustrated in FIG. 2B and FIG. 7B is a sectional view along line VIIb-VIIb of the shaft member 70 illustrated in FIG. 2B. As can be ascertained from FIGS. 2, 6, 7A and 7B, the shaft member 70 is provided with a coupling member 71, a rotating shaft 85, a spherical body 90, and a rotating force transmission pin 95.

Figure 8:
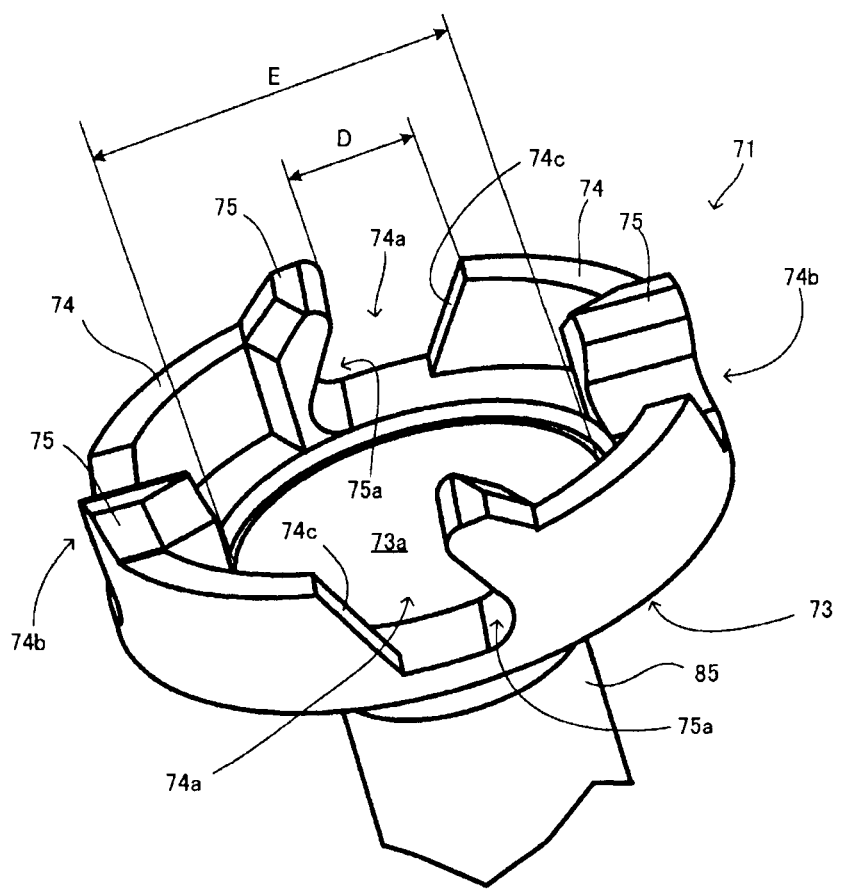
FIG. 8 is an enlarged view of a coupling member.

The coupling member 71 is a part which functions as a rotating force receiving section that receives a rotation driving force from the apparatus body 10 (refer to FIG. 1). FIG. 8 is an enlarged perspective view of the coupling member 71. As can be ascertained from FIGS. 2, and 6 to 8, the coupling member 71 is a member which has a shape of a circular dish, and an inner side thereof includes a bottom section 73 provided with a conical concave section 73a to be the deepest part through which the axis passes.

In addition, on a surface of the bottom section 73, a tube-shaped engagement wall 74 stands along an edge of a surface on one surface side (a side opposite to a side on which the rotating shaft 85 is provided). Two grooves 74a and 74b which oppose each other to locate the axis of the shaft member 70 therebetween are provided in the engagement wall 74. One pair of grooves 74a and the other pair of grooves 74b are shifted by 90 degrees around the axis.

As illustrated in FIG. 8 in detail, in each groove 74a and 74b, a convex section 75 is provided on one side wall of the groove, and a hollow 75a is provided in a circumferential direction on the bottom section 73 side thereof. According to this, as will be described later, a pin 12 of a driving shaft 11 of the apparatus body 10 is engaged with the hollow 75a and is prevented from falling out, and an appropriate rotating force is transmitted (refer to FIG. 22B).

In addition, inclined surfaces 74c are formed on side walls on the other sides of each of the grooves 74a and 74b, and an introduction of the pin 12 into the groove is easily performed.

Therefore, a width of the groove 74a illustrated with D in FIG. 8 is slightly greater than a diameter of the pin 12 (refer to FIG. 22B) and is narrower than the driving shaft 11 so that the driving shaft 11 cannot pass therethrough. In addition, a diameter of an inner side of the engagement wall 74 illustrated with E in FIG. 8 is formed to be slightly greater than a diameter of the driving shaft 11, but generally, is the same level as the diameter of the driving shaft 11. In which manner the rotating force can be received from the driving shaft 11 will be described later.

In the embodiment, four (two pairs) grooves of the engagement wall are provided, but the number thereof is not particularly limited, and may be two (one pair), six (three pairs), or more than six.

The rotating shaft 85 is a columnar shaft-like member which functions as a rotating force transmission section for transmitting the rotating force that the coupling member 71 receives. Therefore, the coupling member 71 is provided on one end of the rotating shaft 85.

The spherical body 90 functions as a base end section, and in the embodiment, as can be ascertained from FIGS. 6 to 7B, the spherical body 90 is a spherical member, and is provided in an end section on the side opposite to the side on which the coupling member 71 is disposed among the end sections of the rotating shaft 85. In this case, it is preferable that the axis of the rotating shaft 85 and the center of the spherical body 90 match each other as much as possible. Accordingly, it is possible to obtain a consistent rotation of the photoreceptor drum 35. In addition, the radius of the spherical body 90 is generally the same as, or slightly smaller than a hemispherical radius of the bottom section 51b of the holding section 50 of the bearing member 45. As apparently described above, the spherical body 90 does not regulate movement of the shaft member 70 in a falling-out direction (upward in FIG. 5A) by the wall section 51a of the holding section 50 of the bearing member 45.

In the embodiment, a case where a normal sphere is used as the base end section is illustrated, but the present invention is not limited thereto. For example, a case where at least a part thereof is spherical, or a case where egg-shaped curved surfaces are combined with each other, may be employed.

The rotating force transmission pin 95 is a columnar shaft-like member which passes through the center of the spherical body 90, and in which both ends are disposed to protrude from the spherical body 90 through the spherical body 90. The axis of the rotating force transmission pin 95 is provided to be orthogonal to the axis of the rotating shaft 85.

A material of the shaft member 70 is not particularly limited, but a resin made of polyacetal, polycarbonate, or PPS can be used. However, in order to improve rigidity of the member, glass fibers, carbon fibers, or the like, may be mixed in the resin in accordance with a loading torque. In addition, rigidity may be further improved by inserting metal into the resin, or the entire member may be made of metal.

Figure 9:
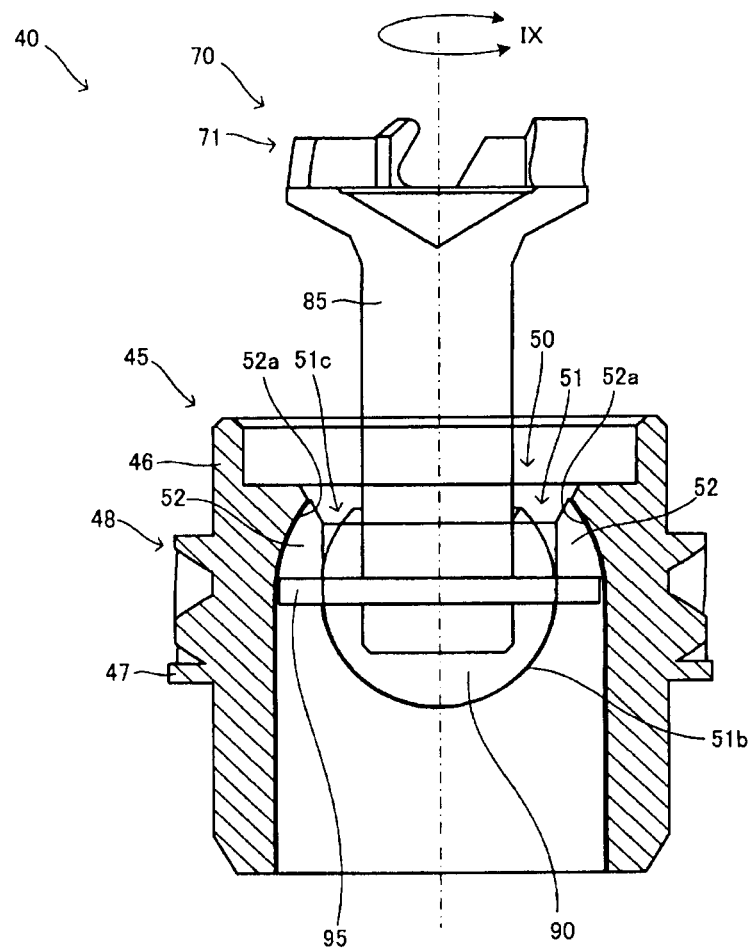
FIG. 9 is a sectional view of the end section member in a direction of an axis along a line illustrated with VIIa-VIIa in FIG. 2B.
Figure 10:
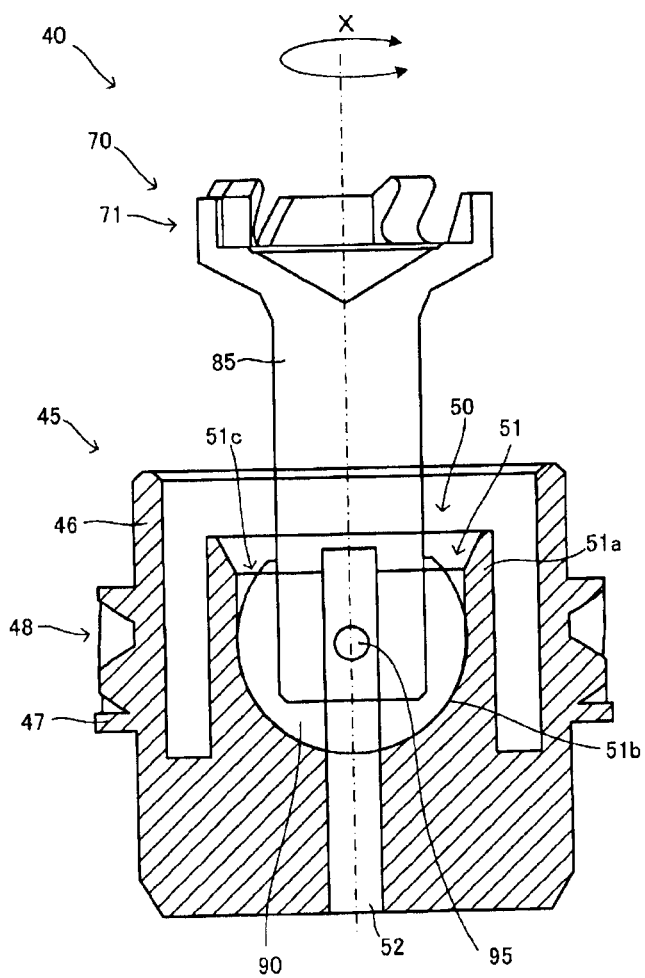
FIG. 10 is a sectional view of the end section member in the direction of the axis along a line illustrated with VIIb-VIIb in FIG. 2B.
Figure 11A:
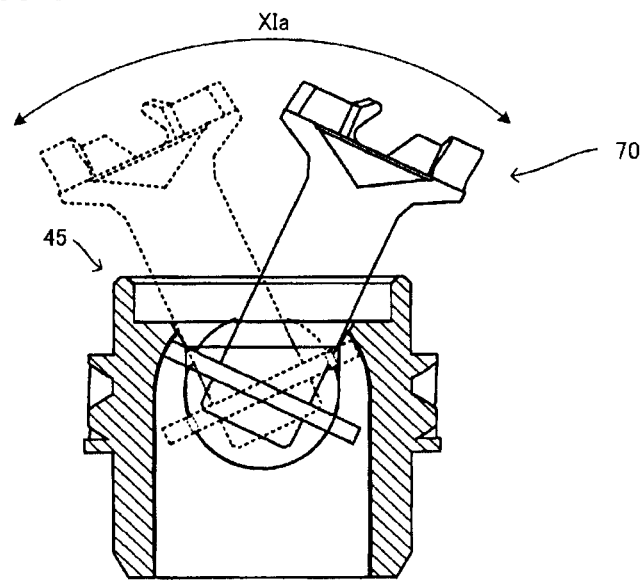
FIG. 11A is a view illustrating a situation in which the shaft member swings on the cross section illustrated in FIG. 9.
Figure 11B:
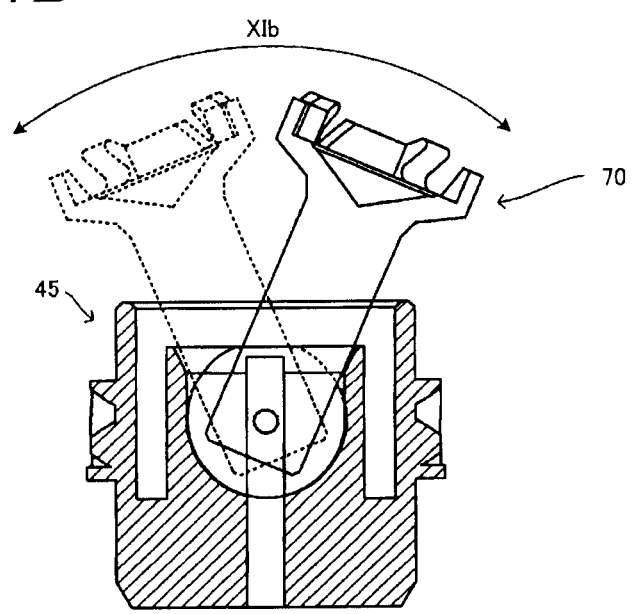
FIG. 11B is a view illustrating a situation in which the shaft member swings on the cross section illustrated in FIG. 10.

By combining the bearing member 45 and the shaft member 70 as follows, the end section member 40 is made. FIG. 9 is a sectional view in the direction of the axis of the end section member 40 along the line illustrated with VIIa-VIIa in FIG. 2B, and FIG. 10 is a sectional view in the direction of the axis of the end section member 40 along the line illustrated with VIIb-VIIb in FIG. 2B. In addition, FIGS. 11A and 11B illustrate a posture in which the shaft member 70 is inclined. FIG. 11A illustrates swing motion of the shaft member 70 on the cross section illustrated in FIG. 9, and FIG. 11B illustrates swing motion of the shaft member 70 on the cross section illustrated in FIG. 10.

As can be ascertained from FIGS. 9 and 10, the spherical body 90 of the shaft member 70 is disposed inside the concave section 51c of the holding section 50. In this case, both end sections of the rotating force transmission pin 95 which protrude from the spherical body 90 are disposed inside the grooves of the two swing grooves 52. Accordingly, the shaft member 70 is held in the bearing member 45. In other words, the diameter of the cylindrical inner side of the wall section 51a that forms the concave section 51c is generally the same as the diameter of the spherical body 90, and the hemispherical radius of the bottom section 51b is generally the same as the radius of the spherical body 90. Accordingly, smooth swinging without rattling is possible. Furthermore, the width of a groove of the swing groove 52 is formed to be slightly wider than a diameter of the rotating force transmission pin 95, and a clearance between bottom parts of the two opposing swing grooves 52 is configured to be greater than the length of the rotating force transmission pin 95.

As the shaft member 70 is disposed and installed on the inner side of the bearing member 45 in this manner, as illustrated with XIa in FIG. 11A, the shaft member 70 can rotate (swing) in a direction in which the axis itself of the rotating force transmission pin 95 swings. This is possible as each of both end sections of the rotating force transmission pin 95 move in a longitudinal direction of the groove in the swing groove 52.

In addition, as illustrated with XIb in FIG. 11B, the shaft member 70 can rotate (swing) around the axis of the rotating force transmission pin 95. In other words, rotation (swinging) in a direction which is orthogonal to a direction illustrated in FIG. 11A around the axis of the rotating force transmission pin 95 is possible.

At this time, another groove for introducing the rotating force transmission pin 95 to the swing groove 52, for example, is not linked to the side wall of the swing groove 52, and since the other irregularity parts are not formed, the other grooves or irregularity parts do not interfere with swinging of the shaft member. Therefore, more reliable smooth swinging is possible.

In addition, when receiving the driving shaft from the apparatus body 10, as illustrated with IX in FIG. 9 and with X in FIG. 10, the shaft member 70 receives the rotating force around the axis thereof. At this time, the coupling member 71 receives the rotation driving force from the apparatus body 10, and following this, the spherical body 90 and the rotating force transmission pin 95 rotate interlocking with each other. In addition, both end sections of the rotating force transmission pin 95 are hooked to a groove side surface (groove side wall) of the swing groove 52, and transfer the rotating force to the bearing member 45, and then, to the photoreceptor drum 35.

Figure 12:
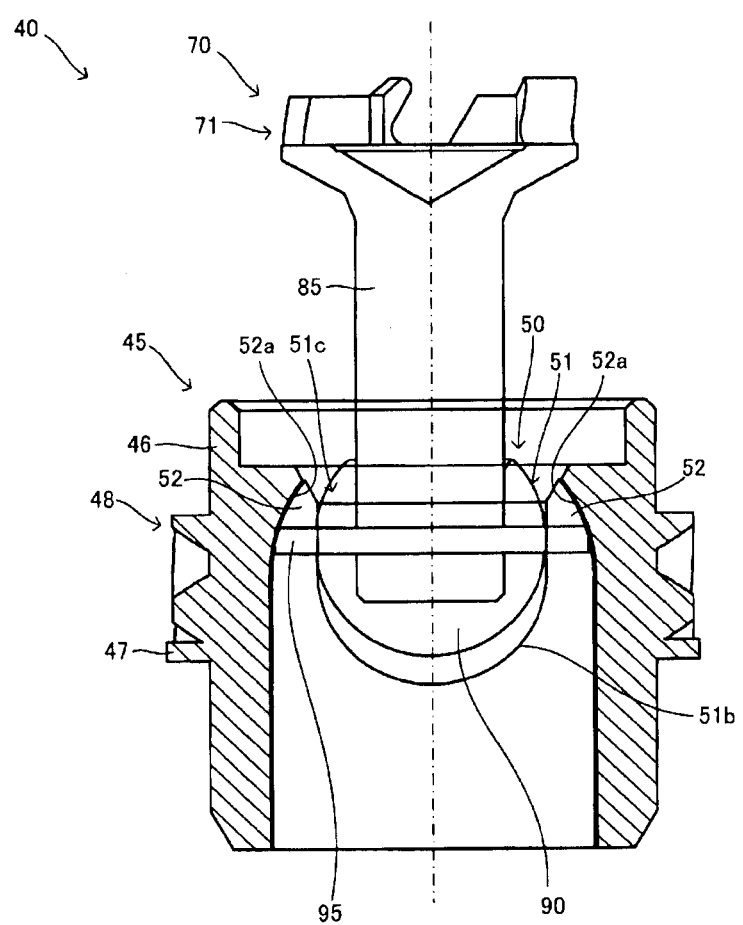
FIG. 12 is a view illustrating a posture in which the shaft member moves in a direction of an axis.

FIG. 12 is a view illustrating a posture of the shaft member 70 and the bearing member 45 in a situation in which the shaft member 70 is pulled in the direction of the axis. Here, a locking section 52a, which is curved in a shape of an arc is provided in the end section of the swing groove 52 as described above, and a bottom clearance of the opposing swing grooves 52 is narrow. Here, as the length of the rotating force transmission pin 95 is set to be longer than a distance of the clearance between the bottom parts of the swing groove 52 in the locking section 52a, even when the shaft member 70 is pulled in the direction of the axis, as illustrated in FIG. 12, the shaft member 70 is not removed from the bearing member 45 since the rotating force transmission pin 95 is hooked to the locking section 52a of the swing groove 52. As apparently described above, the movement of the shaft member 70 in the direction of the axis is regulated by the rotating force transmission pin 95 and the locking section 52a of the swing groove 52.

Figure 13:
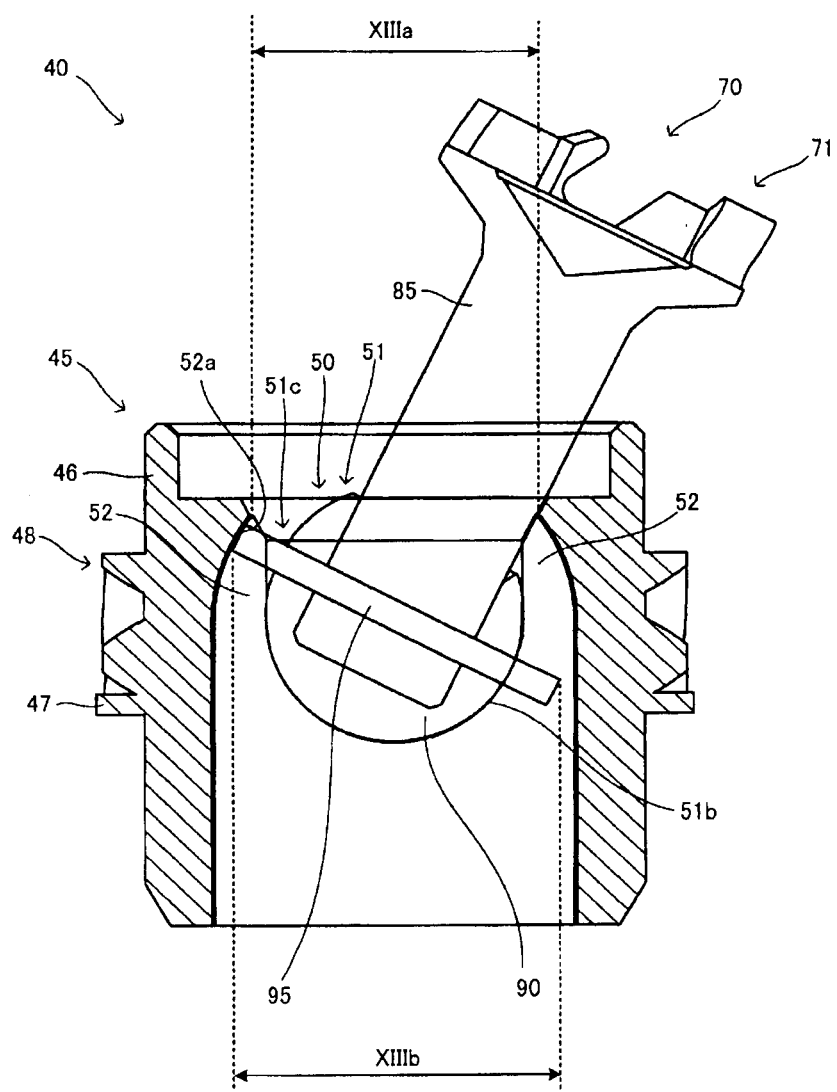
FIG. 13 is a view illustrating a posture when the shaft member is inclined at the most.

In addition, FIG. 13 illustrates a posture in which the shaft member 70 is inclined at the most in cross sections illustrated in FIG. 9. In other words, the posture in which the rotating force transmission pin 95 makes the shaft member 70 inclined at the mostaround the center of the longitudinal direction of the rotating force transmission pin 95. Therefore, one end of the rotating force transmission pin 95 reaches the locking section 52a of the swing groove 52, and the other end is inclined to be isolated from the locking section 52a.

In this case, a distance illustrated with XIIIa in FIG. 13 represents a distance of the clearance between the bottom parts of the swing groove 52 in the locking section 52aIn addition, a distance illustrated with XIIIb in FIG. 13 represents a distance of the clearance between the end sections of the rotating force transmission pin 95 in a radial direction of the tube-shaped body 46 in a posture of the shaft member 70 illustrated in FIG. 13. In addition, in the embodiment, the distance illustrated with XIIIb is formed to be longer than the distance illustrated with XIIIa. Accordingly, the rotating force transmission pin 95 is reliably hooked to the locking section 52a of the swing groove 52 even when the shaft member 70 is inclined at the most, there is not a case where the shaft member 70 is removed from the bearing member 45 at least automatically or by a slight external force. Therefore, it is possible to hold the shaft member 70 in the bearing member 45, and the shaft member 70 can function as the end section member 40 without being removed from the bearing member 45 in an unintended situation.

In addition, taking the shaft member 70 off of the bearing member 45, for example, can be performed by applying a slightly strong force from the posture illustrated in FIG. 13, bending the locking section 52a, and separating one end side of the rotating force transmission pin 95 from the holding section 50. Installing the shaft member 70 to the bearing member 45 may be performed in reverse thereto.

By the end section member 40, it is possible to give an appropriate rotating force to the photoreceptor drum 35 when mounting the process cartridge 20, and to easily attach and detach the process cartridge 20.

The bearing member 45 and the shaft member 70 which constitute the end section member 40 may be configured as a plurality of components are combined with each other, or may be integrally molded as will be described later. In a case of the configuration in which the plurality of components are combined with each other, the components may be formed of the same material, or may be formed of different materials. In addition, the components can be bonded by employing known means, such as bonding by an adhesive, an ultrasound wave, heat sealing, a screw, and a bolt.

Next, a method for manufacturing the bearing member 45 will be described. Here, an example for making the bearing member integral will be described as one preferable embodiment. The bearing member 45 is molded by injection molding as the undercut section is not provided in the concave section and the swing groove as described in the example above. In other words, molding is performed by combining a plurality of molds with each other, injecting a certain flowable material and filling a void section of the combined mold with the material, solidifying the injected material, and then, by disengaging the mold. Therefore, in molding the bearing member 45, a mold for forming shapes of an outer circumferential side and an inner side of the tube-shaped body 46 is necessary. Here, molding of the inner side will be described. In addition, the shape (for example, the gear 48) of the outer circumferential side of the tube-shaped body 46 can be molded by a known method.

Figure 14:
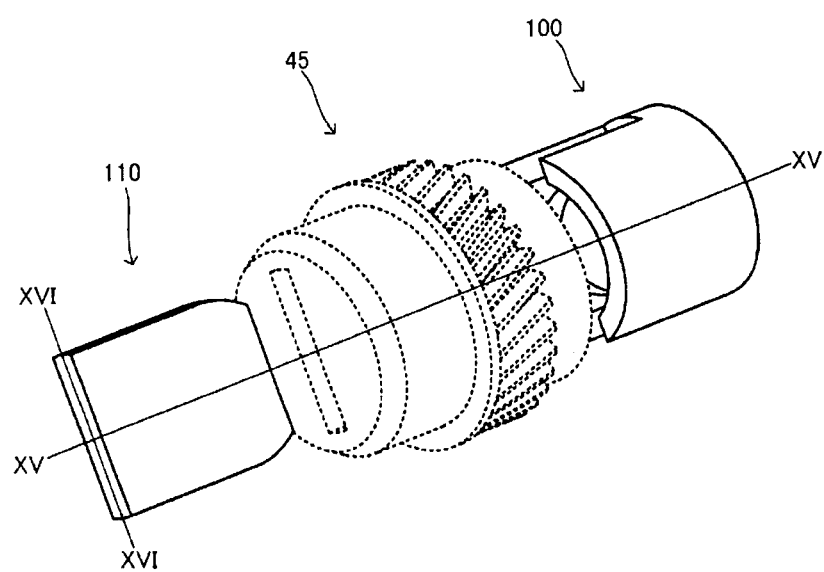
FIG. 14 is a perspective view illustrating molds 100 and 110 for making a bearing member 45.
Figure 15A:
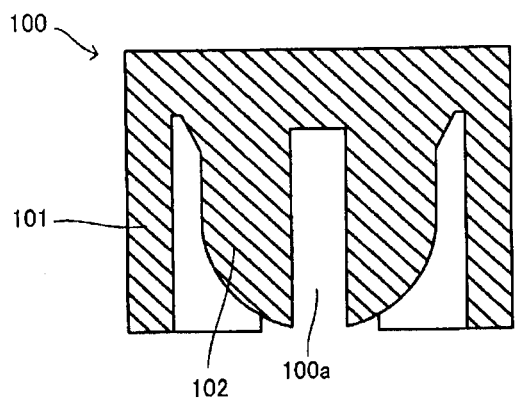
FIGS. 15A to 15C are sectional views in the direction of the axis including a line illustrated with XV in FIG. 14.
Figure 15B:
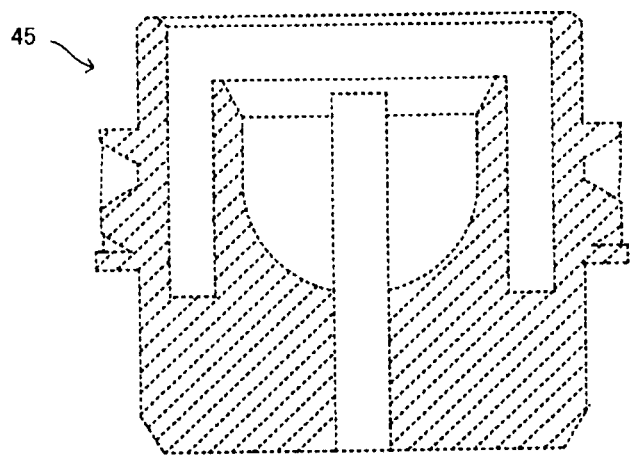
Figure 15C:
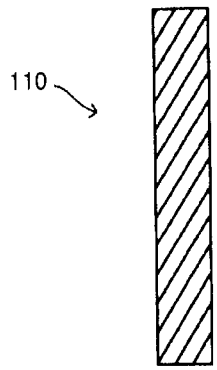
Figure 16A:
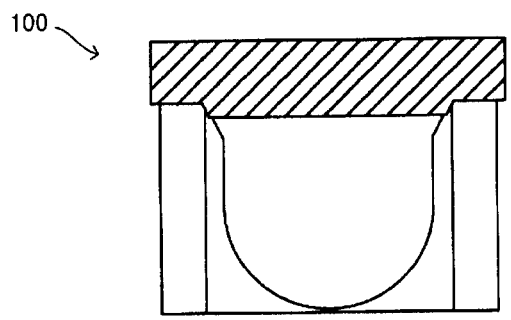
FIGS. 16A to 16C are sectional views in the direction of the axis including a line illustrated with XVI in FIG. 14.
Figure 16B:
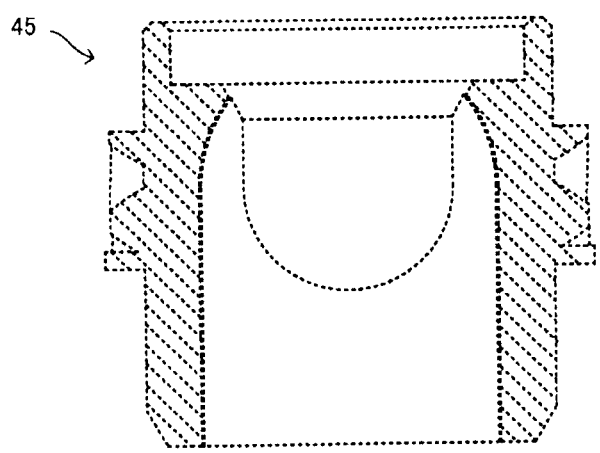
Figure 16C:
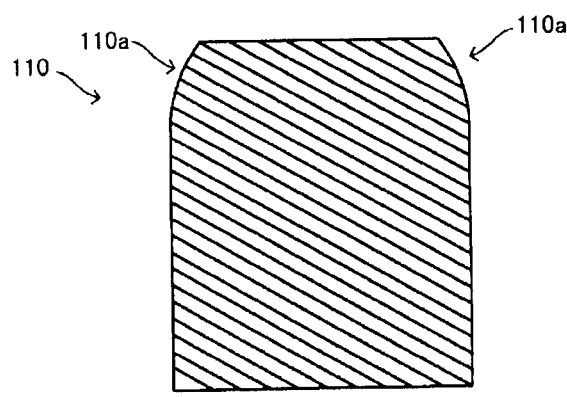

FIG. 14 is a perspective view of a first mold 100 and a second mold 110 which mold the shape of the inner side of the bearing member 45. Here, the molded bearing member 45 is also illustrated together with a dashed line. FIGS. 15A to 15C are sectional views in the direction of the axis including a line illustrated with XV-XV in FIG. 14. FIGS. 16A to 16C are sectional views in the direction of the axis including a line illustrated with XVI-XVI in FIG. 14.

As can be ascertained from FIGS. 14 to 16C, the shape of the inner side of the bearing member 45 is molded by the two molds, including the first mold 100 and the second mold 110.

The first mold 100 is provided with a bottomed cylindrical section 101 and a concave section forming section 102. A cylindrical part of the bottomed cylindrical section 101 is in a shape which forms a void between an inner surface of a cylindrical body of the bearing member 45 and an outer circumferential section of the wall section 51aMeanwhile, as can be ascertained from FIG. 15A, the concave section forming section 102 is provided to protrude from a bottom of the bottomed cylindrical section 101, and is disposed on an inner side of the bottomed cylindrical section 101. The concave section forming section 102 has a shape which can form the spherical body receiving section 51, and has a shape of a dome to correspond to the concave section 51cIn addition, a void is formed between the bottomed cylindrical section 101 and the concave section forming section 102, and the void has a shape which molds the wall section 51a of the bearing member 45.

In the first mold 100, a groove 100a into which the second mold 110 is inserted is formed. The groove 100a has a depth to a position at which the swing groove 52 is formed.

Meanwhile, the second mold 110 is a mold for forming the swing groove 52, and is a plate-shaped member. Therefore, the thickness of the second mold 110 is generally the same as the width of the groove of the swing groove 52, and as can be ascertained from FIG. 16C, a curved section 110a for forming the locking section 52a is formed to narrow the width of the plate of the second mold 110 on one end side of the second mold 110.

Figure 17A:
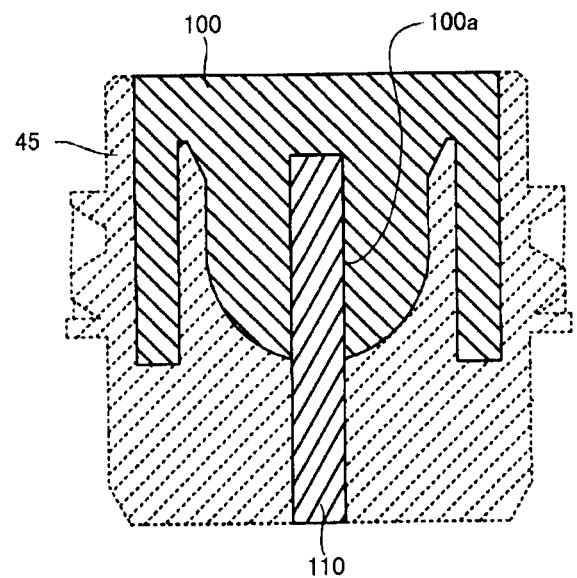
FIG. 17A is a view illustrating a posture in which the first mold 100 and the second mold 110 are combined with each other, from the viewpoint of FIGS. 15A to 15C.
Figure 17B:
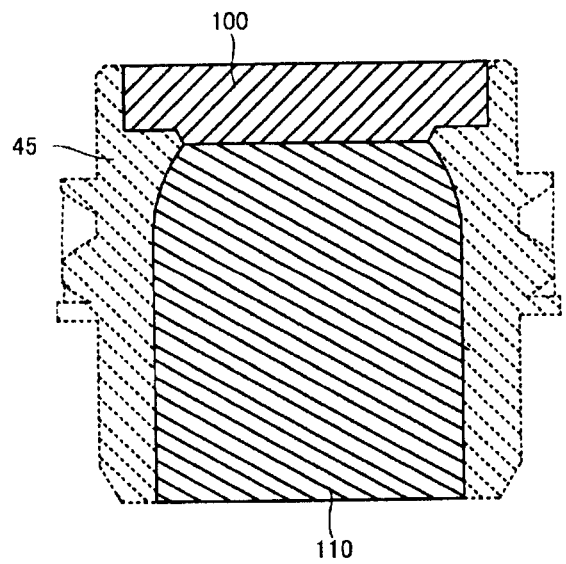
FIG. 17B is a view illustrating a posture in which the first mold 100 and the second mold 110 are combined with each other, from the viewpoint of FIGS. 16A to 16C.

By combining and injection molding the first mold 100, the second mold 110, and other molds which are not illustrated, it is possible to integrally mold the bearing member 45 including the holding section 50. In addition, after molding, it is possible to move and release the first mold 100 and the second mold 110 in directions opposite to each other. FIGS. 17A and 17B are views in which the first mold 100 and the second mold 110 are combined with each other. FIG. 17A is a sectional view from the same viewpoint as that in FIGS. 15A to 15C. FIG. 17B is a sectional view from the same viewpoint as that in FIGS. 16A to 16C.

As can be ascertained from FIG. 17A, the first mold 100 and the second mold 110 are combined with each other as the second mold 110 is inserted into the groove 100a of the first mold 100. At this time, the curved section 110a of the second mold 110 is combined to be a deep part (a side opposite to an opening section of the groove 100a) of the groove 100a.

As injection molding is performed with respect to the combination of the first mold 100 and the second mold 110, it is possible to form a shape of an inner section of the bearing member 45. In addition, after molding, the first mold 100 and the second mold 110 are released by being moved to be pulled apart to an opposite side in the direction of the axis. Since the spherical body receiving section 51 and the swing groove 52 of the bearing member 45 have a shape in which the undercut section is not provided as described above, releasing the first mold 100 and the second mold 110 is smoothly performed without being hooked. In other words, the bearing member 45 described above has a shape which can smoothly and efficiently perform manufacturing by integral molding, and productivity can be improved.

Figure 18A:
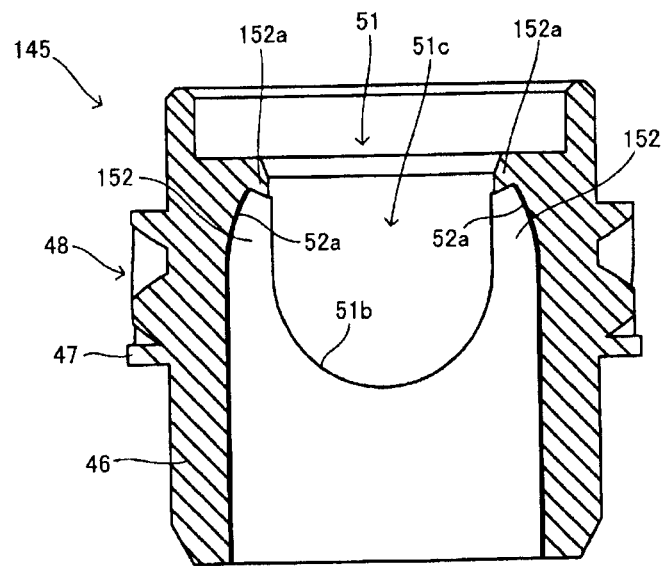
FIG. 18A is a sectional view of a bearing member 145 according to another embodiment.
Figure 18B:
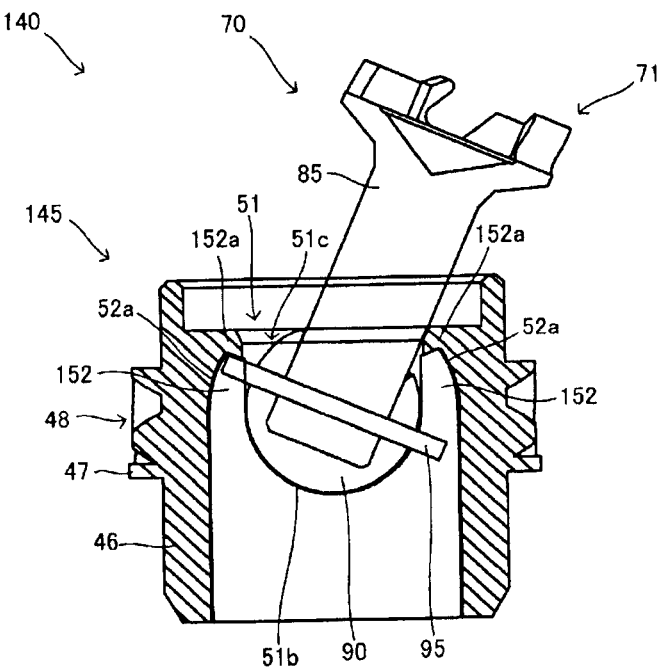
FIG. 18B is a sectional view of an end section member 140.

FIGS. 18A and 18B are views illustrating a bearing member 145 and an end section member 140 in which the shaft member 70 is installed to the bearing member 145 according to a second embodiment. FIG. 18A is a view which corresponds to FIG. 5A. FIG. 18B is a view which corresponds to FIG. 13.

In the bearing member 145 and the end section member 140 according to the embodiment, a protruded section 152a having a shape of a wedge is provided to further narrow a clearance between two swing grooves 152 in the end section on the opened section side of the concave section 51c of the swing groove 152. Other parts of the structure are similar to those of the bearing member 45 and the end section member 40.

According to the end section member 140, as can be ascertained from FIG. 18B, it is possible to reliably prevent the rotating force transmission pin 95 from being hooked to the protruded section 152a in a posture in which the shaft member 70 is inclined at the most, and further, to reliably prevent the shaft member 70 from being removed from the bearing member 145 in an unintended situation.

Figure 19A:
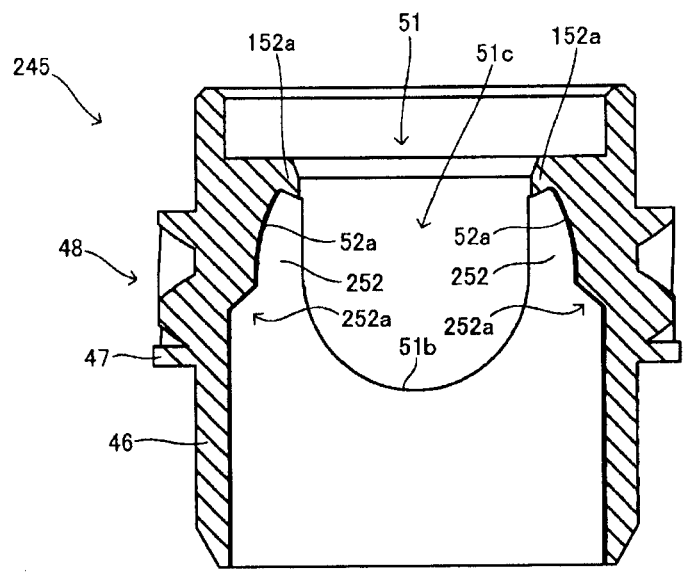
FIG. 19A is a view illustrating a bearing member 245.
Figure 19B:
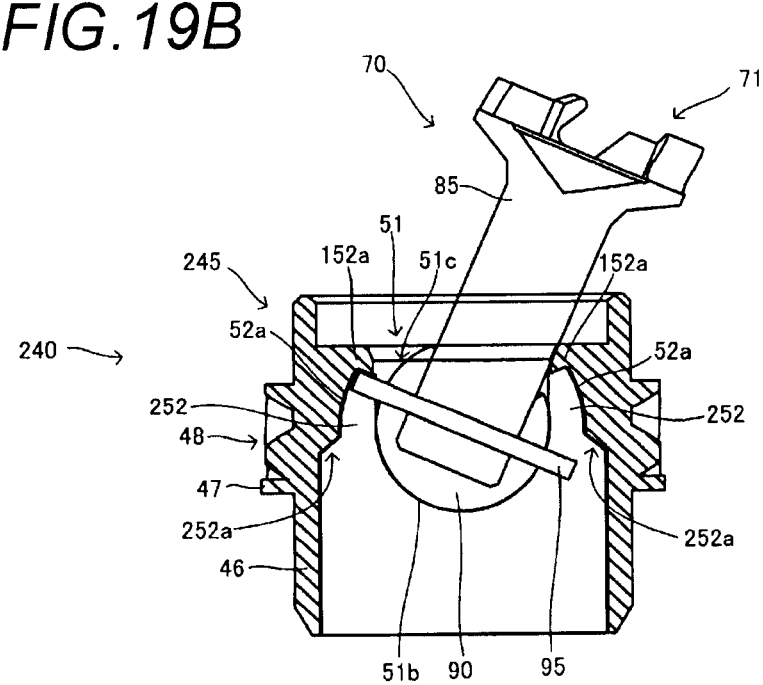
FIG. 19B is a view illustrating an end section member 240.

FIGS. 19A and 19B are views illustrating a bearing member 245, and an end section member 240 in which the shaft member 70 is installed to the bearing member 245 according to a third embodiment. FIG. 19A is a view which corresponds to FIG. 5A. FIG. 19B is a view which corresponds to FIG. 13 in which the shaft member 70 is installed to the bearing member in the FIG. 5A.

In the bearing member 245 and the end section member 240 in which the shaft member 70 is installed to the bearing member 245 according to the embodiment, the above-described protruded section 152a is provided in the end section on the opened section side of the concave section 51c of an swing groove 252. Furthermore, in the bearing member 245, in the swing groove 252, a step 252a is provided so that the clearance between the two swing grooves 252 widens as being isolated from an axis of the bearing member 245, from the end section on the side opposite to the protruded section 152a of the curved locking section 52aOther parts of the structure are similar to those of the bearing member 45 and the end section member 40.

According to the end section member 240, as can be ascertained from FIG. 19B, it is possible to reliably prevent the rotating force transmission pin 95 from being hooked to the protruded section 152a in the posture in which the shaft member 70 is inclined at the most, and further, to reliably prevent the shaft member 70 from being removed from the bearing member 245 in an unintended situation.

Furthermore, according to the bearing member 245, it is possible to install the shaft member 70 to the bearing member 245 as follows. FIGS. 20A to 20F illustrate explanation views. FIGS. 20A to 20F are illustrated following an order of installation of the shaft member 70 to the bearing member 245. The order will be described hereinafter. In addition, in FIGS. 20A to 20F, many reference numerals are omitted in order to make the drawings easy to understand, but it is possible to refer to FIGS. 19A and 19B regarding the omitted reference numerals.

Figure 20A:
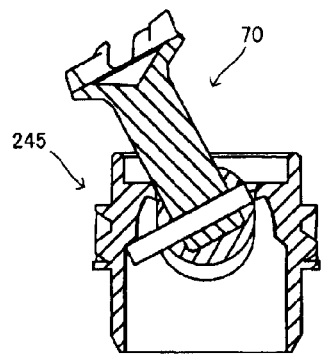
FIGS. 20A to 20F are views illustrating an assembly of the end section member 240.

First, as illustrated in FIG. 20A, the rotating force transmission pin 95 of the shaft member 70 protrudes as being largely put aside so that only one end section thereof protrudes from the spherical body 90. In addition, the shaft member 70 is inclined so that the protruded end section of the rotating force transmission pin 95 reaches the step 252a of the swing groove, and the spherical body 90 is inserted into the concave section 51c of the bearing member 45.

Figure 20B:
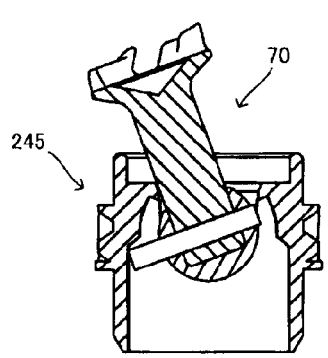
Figure 20C:
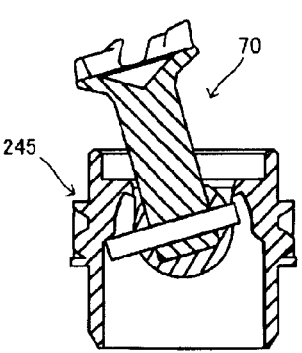
Figure 20D:
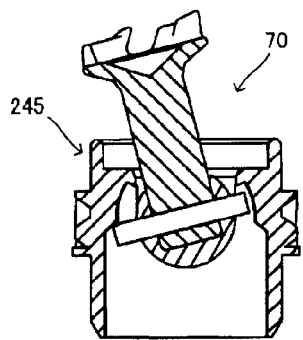

Next, as illustrated in order in FIGS. 20B, 20C, and 20D, the shaft member 70 is gradually raised along the direction of the axis of the bearing member 245. Accordingly, the end section of the rotating force transmission pin 95 which protrudes from the spherical body 90 is pressed from a bottom section of the swing groove 252 to an extent to exceed the step 252a, and the rotating force transmission pin 95 moves to the opposite side in the direction of the axis thereof.

Figure 20E:
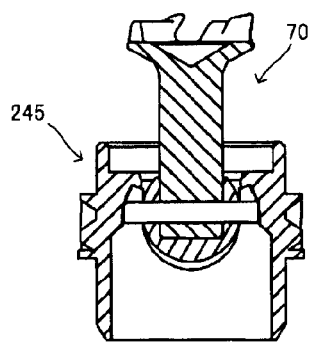
Figure 20F:
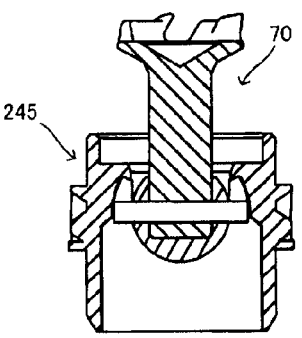

Then, as illustrated in FIG. 20E, when the axis of the shaft member 70 is in a posture of overlapping in the direction of the axis of the bearing member 245, both ends of the rotating force transmission pin 95 protrude to the same extent from the spherical body 90. From this posture, as illustrated in FIG. 20F, loading and installing the spherical body 90 of the shaft member 70 to the bottom section 51b of the bearing member 245 is completed.

According to this, without so-called forcible inputting, it is possible to install the shaft member to the bearing member.

In other words, in the embodiment, the rotating force transmission pin 95 provided in the shaft member 70 of the end section member 240 is configured to become a posture in which both ends of the rotating force transmission pin 95 protrude from the spherical body 90, and a posture in which only one end of the rotating force transmission pin 95 protrudes. In addition, similarly to another embodiment, by the curved part 52a of the swing groove 252 of the bearing member 245, the movement of the rotating force transmission pin 95 in the swing groove 252 is regulated. In addition, the spherical body 90 can rotate in the concave section of the bearing member 245, the movement of the rotating force transmission pin 95 in the direction of the axis of the bearing member 245 is regulated by the curved part 52a of the swing groove 252, and the shaft member 70 is installed to the bearing member 245 to be turnable in a posture in which the movement is regulated.

Figure 21A:
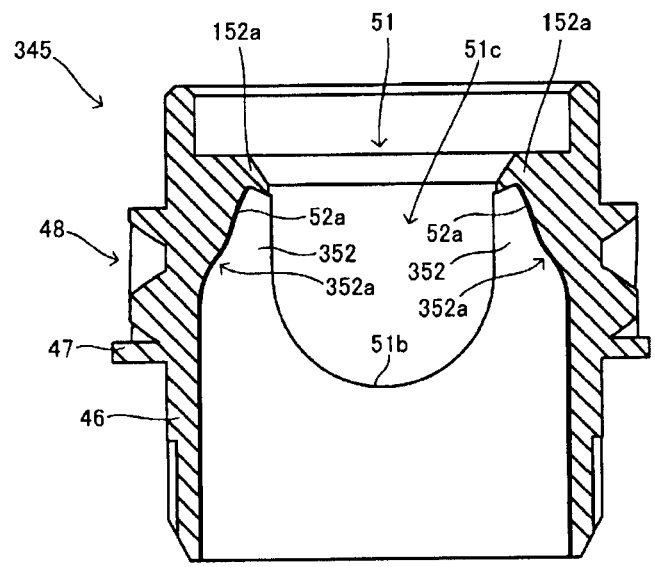
FIG. 21A is a view illustrating a bearing member 345.
Figure 21B:
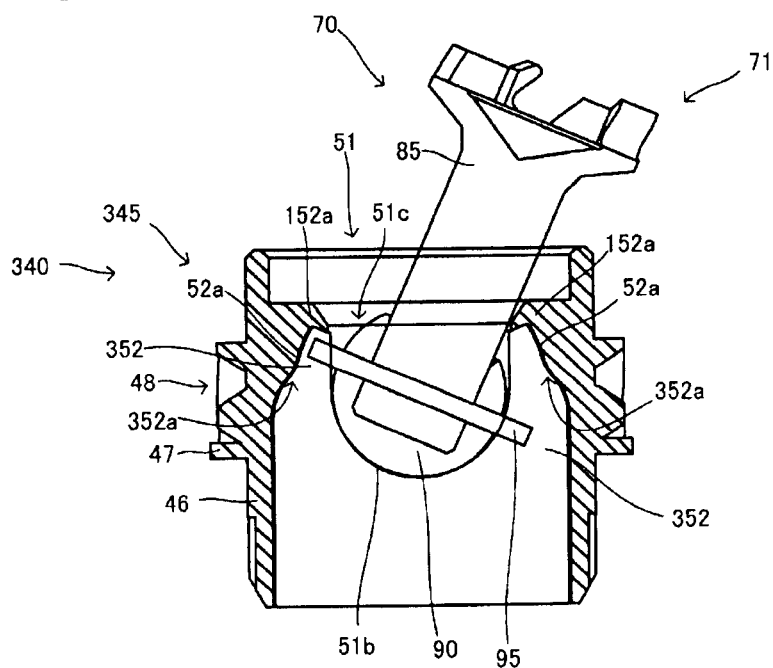
FIG. 21B is a view illustrating an end section member 340.

FIGS. 21A and 21B are views illustrating a bearing member 345 and an end section member 340 in which the shaft member 70 is installed to the bearing member 345 according to a fourth embodiment. FIG. 21A is a view which corresponds to FIG. 5A. FIG. 21B is a view which corresponds to FIG. 13 in which the shaft member 70 is installed to the shaft member in the FIG. 5A.

In the bearing member 345 and the end section member 340 in which the shaft member 70 is installed to the shaft member 70 according to the embodiment, the above-described protruded section 152a is provided in the end section on the opened section side of the concave section 51c of an swing groove 352. Furthermore, in the bearing member 345, in the swing groove 352, an inclined section 352a is provided so that the clearance between the two swing grooves 352 widens as being isolated from the axis, from the end section on the side opposite to the protruded section 152a of the curved locking section 52a. Other parts of the structure are similar to those of the bearing member 45 and the end section member 40.

According to the end section member 340, as can be ascertained from FIG. 21B, it is possible to reliably prevent the rotating force transmission pin 95 from being hooked to the protruded section 152a in the posture in which the shaft member 70 is inclined at the most, and further, to reliably prevent the shaft member 70 from being removed in an unintended situation. In addition, the inclined section 352a acts similarly to the step 252a of the bearing member 245, and the shaft member 70 can be smoothly installed.

Returning to FIG. 1, the description of the process cartridge 20 will be continued. As the charging roller, the developing roller, the developing blade, the transfer roller, and the cleaning blade, which are other constituent elements provided inside the housing 21 of the process cartridge 20, known members can be employed, and examples thereof are as follows.

The charging roller charges the photoreceptor drum 35 by applying a voltage from the apparatus body 10. Charging is performed as the charging roller rotates following the photoreceptor drum 35, and comes into contact with the outer circumferential surface of the photoreceptor drum 35.

The developing roller is a roller which supplies a developer to the photoreceptor drum 35. In addition, by the developing roller, an electrostatic latent image which is formed in the photoreceptor drum 35 is developed. In addition, the developing roller has a fixed magnet embedded therein.

The developing blade is a blade which adjusts an amount of the developer which adheres to the outer circumferential surface of the developing roller, and gives a frictional electrification charge to the developer itself.

The transfer roller is a roller for transferring the image which is formed in the photoreceptor drum 35 to the recording medium, such as a paper sheet.

The cleaning blade is a blade which comes into contact with the outer circumferential surface of the photoreceptor drum 35 and eliminates the developer that remains after transferring by the tip end thereof.

Each of the rollers is stored inside the housing 21 to be rotatable. In other words, each roller realizes functions thereof by rotating as necessary inside the housing 21.

Here, in the shaft member 70 of the photoreceptor drum unit 30, at least the coupling member 71 is disposed to be exposed from the housing 21. Accordingly, as will be described later, it is possible to obtain the rotation driving force from the apparatus body 10, and attaching and detaching the apparatus body 10 and the process cartridge 20 becomes easy.

Here, each roller and blade that is provided in the process cartridge 20 is described, but the members provided here are not limited thereto, and it is preferable that the members, parts, and developers which are generally provided in other process cartridges are provided.

Next, the apparatus body 10 will be described. The apparatus body 10 of the embodiment is a laser printer. In the laser printer, an operation is performed in a posture in which the process cartridge 20 is mounted, and when an image is formed, the photoreceptor drum 35 is rotated, and charging is performed by the charging roller. In this state, the photoreceptor drum 35 is irradiated with laser light which corresponds to image information by using various optical members provided here, and an electrostatic latent image based on the image information is obtained. The latent image is developed by the developing roller.

Meanwhile, the recording medium, such as the paper sheet, is set in the apparatus body 10, and transferred to a transfer position by a feeding roller or a transporting roller, which is provided in the apparatus body 10. The transfer roller is disposed at the transfer position, a voltage is applied to the transfer roller as the recording medium passes, and the image is transferred to the recording medium from the photoreceptor drum 35. After this, the image is fixed to the recording medium as heat and pressure are applied to the recording medium. In addition, the recording medium on which the image is formed is discharged from the apparatus body 10 by a discharging roller or the like.

In this manner, in the posture in which the process cartridge 20 is mounted, the apparatus body 10 gives the rotation driving force to the photoreceptor drum unit 30. Here, which manner the rotation driving force is given to the photoreceptor drum unit 30 from the apparatus body 10 in the posture in which the process cartridge 20 is mounted, will be described.

Figure 22A:
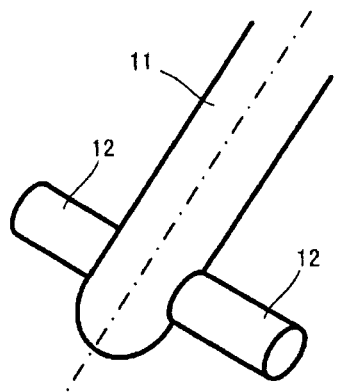
FIG. 22A is a perspective view illustrating a driving shaft of an image forming apparatus body and a pin.

The rotation driving force to the process cartridge 20 is given by the driving shaft 11 which serves as a rotating force giving section of the apparatus body 10. FIG. 22A illustrates a shape of a tip end section of the driving shaft 11. As can be ascertained from FIG. 22A, the tip end of the driving shaft 11 is a columnar shaft member which is a hemispherical surface, and the columnar pin 12 which serves as the rotating force giving section that protrudes in a direction which is orthogonal to an axis of rotation illustrated with one-dot chain line is provided. On the side opposite to the tip end side illustrated in FIG. 22A of the driving shaft 11, a gear row is formed so as to make it possible to rotate the driving shaft 11 around the axis, and according to this, the gear row is connected to a motor which is a driving source.

In addition, with respect to a moving direction for attaching and detaching of the process cartridge 20 to and from the apparatus body 10 as illustrated in FIG. 1, the driving shaft 11 is disposed to protrude on a track of the movement of attaching and detaching generally at a right angle. In addition to this, the driving shaft 11 only rotates without moving in the direction of the axis. Therefore, in attaching and detaching the process cartridge 20, it is necessary to mount and disengage the shaft member 70 to and from the driving shaft 11. In addition, according to the end section member 40, mounting and disengaging the shaft member 70 to and from the driving shaft 11 becomes easy. A specific aspect of attaching and detaching will be described later in detail.

Figure 22B:
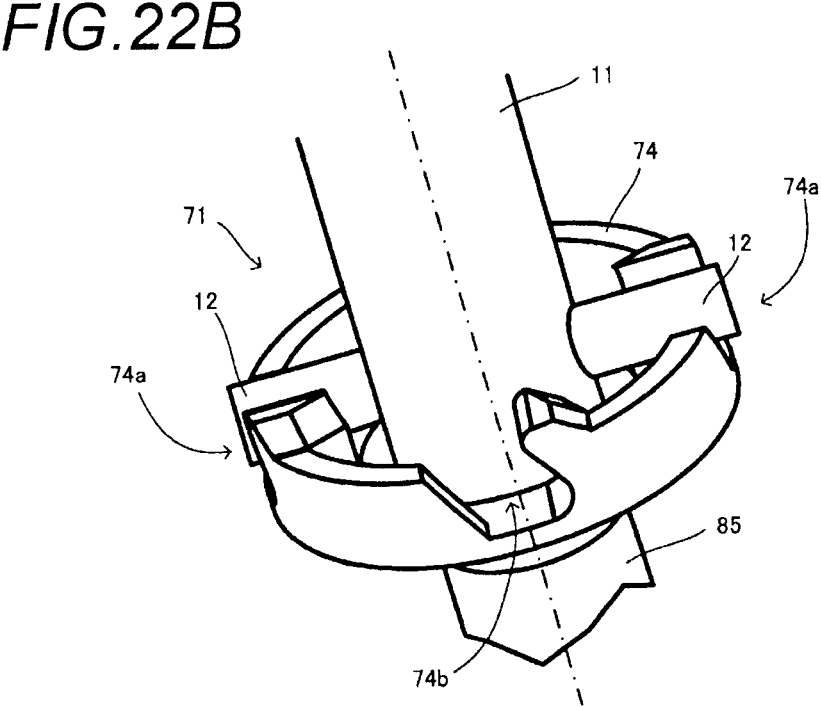
FIG. 22B is a view illustrating a posture in which the pin is linked to the coupling member.

In a posture in which the process cartridge 20 is mounted on the apparatus body 10, the driving shaft 11 and the coupling member 71 of the shaft member 70 of the end section member 40 are engaged with each other, and the rotating force is transmitted. FIG. 22B illustrates a situation in which the coupling member 71 of the end section member 40 is engaged with the driving shaft 11. As can be ascertained from FIG. 22B, in a posture in which the driving shaft 11 and the coupling member 71 are engaged with each other, the axis of the driving shaft 11 and the axis of the coupling member 71 are disposed to be abutted against each other so that the axes match each other. At this time, the pin 12 of the driving shaft 11 is disposed on inner sides of the groove 74a and the groove 74b that oppose each other in the coupling member 71 (in FIG. 22B, a case where the pin 12 is disposed on the inner side of the groove 74a). Accordingly, the coupling member 71 rotates following the rotation of the driving shaft 11, and the photoreceptor drum unit 30 rotates.

Accordingly, a posture in which the rotating force is transmitted is a posture in which the axis of the driving shaft 11 and the coupling member 71 are disposed coaxially, and the pin 12 is on the inner sides of the groove 74a and the groove 74b.

Figure 23A:
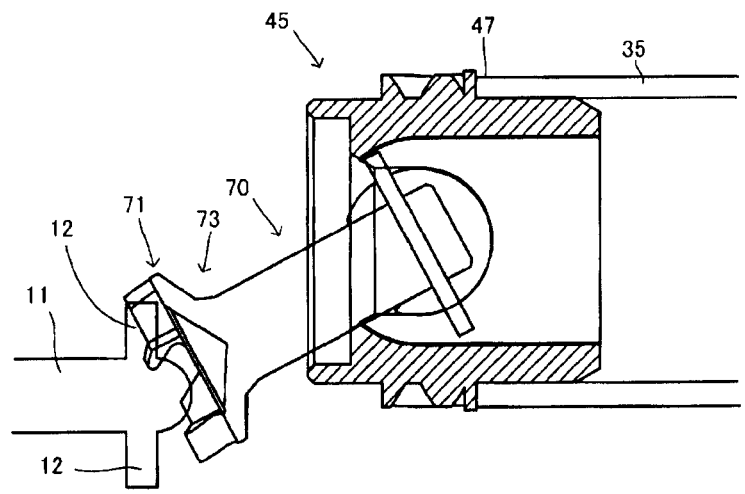
FIGS. 23A and 23B are views illustrating an example of a situation in which a process cartridge is mounted on the apparatus body.
Figure 23B:
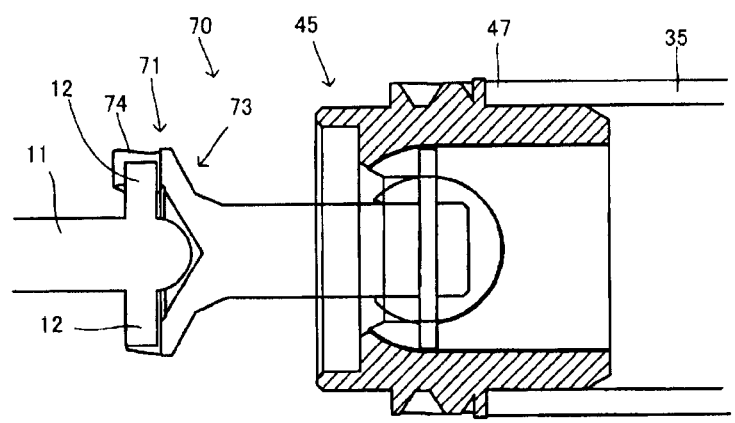

Next, examples of operations of the driving shaft 11 and the photoreceptor drum unit 30 when the process cartridge 20 is mounted on the apparatus body 10 will be described. FIGS. 23A and 23B are explanation views. FIG. 23A is a view illustrating one situation in which the end section member 40 is mounted on the driving shaft 11. FIG. 23B is a view illustrating another situation in which the end section member 40 is mounted on the driving shaft 11. An order of the operations is illustrated in FIGS. 23A and 23B, and right and left on a paper surface is an orientation which becomes the direction of the axis. Here, the situation is a situation in which the process cartridge 20 is moved to a lower part on the paper surface and mounted.

First, as illustrated in FIG. 23A, a posture in which the coupling member 71 of the shaft member 70 is inclined to the driving shaft 11 side is obtained. It is preferable that this posture is a posture in which the shaft member 70 is inclined at the most. When moving the process cartridge 20 to the lower part on the paper surface from this posture, the tip end of the driving shaft 11 comes into contact with the inner side of the bottom section 73 of the coupling member 71 or the engagement wall 74 being hooked thereto. When the process cartridge 20 is further pushed into the apparatus body 10, the driving shaft 11 which comes into contact with the coupling member 71 being hooked thereto rotates to exceed the inclined shaft member 70. In addition, the pin 12 is inserted to the inside of the groove 74a.

Furthermore, by pushing the process cartridge 20 in a mounting direction, as illustrated in FIG. 23B, a posture in which the axis of the inclined shaft member 70 and the axis of the driving shaft 11 match each other, and the axes of the driving shaft 11, the shaft member 70, the bearing member 45, and the photoreceptor drum 35 match each other is obtained as illustrated in FIG. 23B. Accordingly, the rotating force is appropriately given to the shaft member 70, the bearing member 45, and the photoreceptor drum 35 from the driving shaft 11, and the rotating force is finally given to the process cartridge 20.

Meanwhile, operations of the driving shaft 11 and the photoreceptor drum unit 30 when disengaging the process cartridge 20 from the apparatus body 10 may retrace the above-described order.

As described above, it is possible to disengage the process cartridge 20 from the apparatus body 10 to be pulled out in a direction different from the direction of the axis of the driving shaft 11 of the apparatus body 10, and to mount the process cartridge 20 on the apparatus body 10 to be pushed into the apparatus body 10.

According to the present invention, a bearing member, an end section member, and a photoreceptor drum unit which can perform production by suppressing issues, such as damage, with high precision, are provided.

What is claimed is:
1. An end section member comprising:
   a shaft member;
   a bearing member to be disposed in an end section of a photoreceptor drum,
   wherein the shaft member includes a spherical body of which at least one part is spherical and a rotating force transmission pin provided to protrude from the spherical body, the shaft member is swingably installed in the bearing member, the bearing member comprising:
   a concave section in which one section is opened and a bottom section on a side opposite to the one section has a curved surface along the spherical body, the concave section configured to receive the spherical body therein; and
   at least two swing grooves being grooves which are provided on a side surface of the concave section and into which end sections of the rotating force transmission pin are configured to be inserted, wherein each swing groove at least includes a parallel part which is parallel to an axis of the bearing member and a curved part curved toward the axis, wherein an undercut section is not provided in the concave section when the concave section is viewed from an opened side of the concave section in a direction of the axis of the bearing member, and wherein the shaft member is prevented from being removed from the bearing member as the rotating force transmission pin of the shaft member is hooked to the curved part of the swing grooves of the bearing member.

2. The end section member according to claim 1, further comprising a protruded section provided at the curved part of the swing grooves.

3. The end section according to claim 1, wherein the curved part of the swing grooves is formed in an arc shape, and a center of the arc-shape matches a center of the curved surface of the bottom section of the concave section of the bearing member.

4. The end section member according to claim 1, wherein the swing grooves are provided with a step or an inclination in a direction of separating from the axis of the bearing member between the curved part and the parallel part.

5. The end section member according to claim 1, wherein an undercut section is not provided in the swing grooves when the bearing member is viewed from the side opposite to the opened side of the concave section.

6. The end section member according to claim 1, wherein all elements of the bearing member are integrally formed.

7. The end section member according to claim 1;
wherein the shaft member includes:
a rotating force receiving section to be linked to a rotating driving shaft;
the spherical body which is interlocked with the rotating force receiving section, and in which at least a part disposed in the concave section of the bearing member is spherical; and
the rotating force transmission pin which protrudes from the spherical body and in which the protruded part is movable in the swing groove of the bearing member.

8. The end section member according to claim 7, wherein the rotating force transmission pin of the shaft member is allowed to be in a posture in which both ends of the rotating force transmission pin protrude from the spherical body, and a posture in which only one end of the rotating force transmission pin protrudes,
wherein, the spherical body is rotatable in the concave section of the bearing member by the curved part of the swing grooves of the bearing member within a range where the movement of the rotating force transmission pin in the swing groove is regulated, and
wherein the movement of the rotating force transmission pin in the direction of the axis of the bearing member is regulated by the curved part of the swing grooves, and the shaft member is installed to the bearing member to be turnable in a posture in which the movement is regulated.

9. A photoreceptor drum unit comprising:
a photoreceptor drum; and
the end section member according to claim 7 which is installed at least to one of end sections in a direction of an axis of the photoreceptor drum.

10. A method for manufacturing a bearing member according to claim 1, the method comprising:
a step of forming by injection molding,
wherein the step includes combining a first mold which forms the concave section and a second mold which forms the swing grooves by putting the second mold into a groove provided in the first mold, performing the injection molding and pulling apart the first mold and the second mold in opposite directions to each other.

11. A system for transmitting a rotation force from a shaft member to a bearing member, the system comprising:
a shaft member, the shaft member including:
a rotating force receiving section to be linked to a rotating driving shaft,
a spherical body which is interlocked with the rotating force receiving section, and
a rotating force transmission pin which protrudes from the spherical body;
a bearing member configured to be disposed in an end section of a photoreceptor drum, the bearing member including:
a concave section in which one section is opened and a bottom section on a side opposite to the one section has a curved surface along the spherical body, the concave section configured to receive the spherical body therein, and
at least two swing grooves being grooves which are provided on a side surface of the concave section and into which end sections of the rotating force transmission pin are configured to be inserted,
wherein each swing groove at least includes a parallel part which is parallel to an axis of the bearing member and a curved part curved toward the axis,
wherein the shaft member is configured to be swingably installed to the bearing member,
wherein at least a part of the spherical body disposed in the concave section of the bearing member is spherical,
the protruded part of the rotating force transmission pin is movable in the at least two swing grooves of the bearing member,
wherein an undercut section is not provided in the concave section when the concave section is viewed from an opened side of the concave section in a direction of the axis of the bearing member,
wherein a clearance between the two swing grooves in a direction which is orthogonal to the direction of the axis on the opened side of the concave section is formed to be shorter than a distance between both ends of the rotating force transmission pin in the direction which is orthogonal to the axis of the bearing member even when the shaft member is mounted on the bearing member in a posture inclined at the most, and
wherein the shaft member is prevented from being removed from the bearing member as the rotating force transmission pin of the shaft member is hooked to the swing grooves of the bearing member.

* * * * *